United States Patent
Naruse et al.

(10) Patent No.: US 9,892,495 B2
(45) Date of Patent: Feb. 13, 2018

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Yousuke Naruse, Saitama (JP); Masahiko Sugimoto, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/265,301

(22) Filed: Sep. 14, 2016

(65) Prior Publication Data

US 2017/0004606 A1 Jan. 5, 2017

Related U.S. Application Data

(63) Continuation of application No. PCT/JP2015/053654, filed on Feb. 10, 2015.

(30) Foreign Application Priority Data

Mar. 31, 2014 (JP) .................................. 2014-071463

(51) Int. Cl.
*G06T 5/00* (2006.01)
*G06T 5/10* (2006.01)
(Continued)

(52) U.S. Cl.
CPC ................ *G06T 5/008* (2013.01); *G06T 5/10* (2013.01); *H04N 1/4092* (2013.01);
(Continued)

(58) Field of Classification Search
CPC .... H04N 5/23229; H04N 9/646; H04N 9/077; H04N 5/3572; H04N 9/77; H04N 9/083;
(Continued)

(56) References Cited

U.S. PATENT DOCUMENTS

2011/0135213 A1* 6/2011 Hatakeyama ........... G06T 5/003
382/254
2011/0135216 A1* 6/2011 Hatakeyama ........... G06T 5/003
382/260
(Continued)

FOREIGN PATENT DOCUMENTS

JP 2011-59813 A 3/2011
JP 2011-124692 A 6/2011
(Continued)

OTHER PUBLICATIONS

International Search Report for PCT/JP2015/053654 (PCT/ISA/210) dated May 19, 2015.
(Continued)

*Primary Examiner* — Timothy J Henn
(74) *Attorney, Agent, or Firm* — Birch, Stewart, Kolasch, & Birch, LLP

(57) ABSTRACT

Disclosed are an image processing device, an imaging device, an image processing method, and an image processing program capable of, when recovering a deteriorated image due to a point spread function of an optical system, effectively performing phase recovery and suppressing the occurrence of artifact due to frequency recovery processing. The image processing device includes a phase recovery processing unit which subjects image data acquired from an imaging element by capturing an object image using an optical system to phase recovery processing using a phase recovery filter based on a point spread function of the optical system, a gradation correction processing unit which subjects image data subjected to the phase recovery processing to nonlinear gradation correction, and a frequency recovery processing unit which subjects image data subjected to the gradation correction to frequency recovery processing using
(Continued)

a frequency recovery filter based on the point spread function of the optical system.

20 Claims, 18 Drawing Sheets

(51) Int. Cl.
*H04N 1/40* (2006.01)
*H04N 5/357* (2011.01)
*H04N 1/409* (2006.01)
H04N 9/04 (2006.01)
H04N 9/64 (2006.01)

(52) U.S. Cl.
CPC . *H04N 5/3572* (2013.01); *G06T 2207/10024* (2013.01); *G06T 2207/20024* (2013.01); *H04N 9/045* (2013.01); *H04N 9/646* (2013.01)

(58) Field of Classification Search
CPC ........ H04N 1/4092; H04N 9/69; H04N 5/208; H04N 9/045; G06T 5/008; G06T 5/10
See application file for complete search history.

(56) References Cited

U.S. PATENT DOCUMENTS

| | | | | |
|---|---|---|---|---|
| 2011/0285879 A1* | 11/2011 | Hatakeyama | ........... | G06T 5/003 348/241 |
| 2011/0292257 A1* | 12/2011 | Hatakeyama | ............ | H04N 1/58 348/242 |
| 2012/0320240 A1 | 12/2012 | Kano | | |
| 2013/0050540 A1* | 2/2013 | Kano | ..................... | H04N 9/045 348/241 |
| 2014/0211038 A1* | 7/2014 | Watanabe | ............... | G06T 5/001 348/222.1 |
| 2015/0379695 A1* | 12/2015 | Naruse | ................... | H04N 1/409 348/234 |
| 2016/0027155 A1* | 1/2016 | Naruse | ................... | H04N 1/409 382/167 |
| 2016/0119603 A1* | 4/2016 | Hayashi | ................. | G06T 5/003 348/222.1 |
| 2016/0165127 A1* | 6/2016 | Naruse | ................... | G06T 5/003 348/222.1 |
| 2017/0006218 A1* | 1/2017 | Naruse | ............... | H04N 5/23229 |

FOREIGN PATENT DOCUMENTS

| | | |
|---|---|---|
| JP | 2012-49759 A | 3/2012 |
| JP | 2013-20610 A | 1/2013 |

OTHER PUBLICATIONS

Written Opinion of the International Searching Authority for PCT/JP2015/053654 (PCT/ISA/237) dated May 19, 2015.
English Translation of International Preliminary Report on Patentability (including PCT/IB/373 and PC/ISA/237) for PCT/JP2015/053654, dated Oct. 4, 2016.

* cited by examiner

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2015/053654 filed on Feb. 10, 2015, which claims priority under 35 U.S.C § 119(a) to Patent Application No. 2014-071463 filed in Japan on Mar. 31, 2014, all of which are hereby expressly incorporated by reference into the present application.

BACKGROUND OF THE INVENTION

1. Field of the Invention

The present invention relates to an image processing device, an imaging device, an image processing method, and non-transitory computer readable recording medium storing an image processing program regarding restoration processing based on a point spread function.

2. Description of the Related Art

In an object image captured through an optical system, a point spread phenomenon in which a point object has minute spread due to the influence of diffraction, aberration, or the like caused by the optical system may be observed. A function representing a response to a point light source of an optical system is called a point spread function (PSF), and is known as a characteristic responsible for resolution deterioration (blurring) of a captured image.

The image quality of the captured image with deteriorated image quality due to the point spread phenomenon can be recovered through point image restoration processing based on the PSF. The point image restoration processing is processing in which deterioration characteristics (point image characteristics) caused by aberration or the like of a lens (optical system) are determined in advance, and point spread of the captured image is cancelled or reduced through image processing using a restoration filter (recovery filter) according to the point image characteristics.

The point image restoration processing can be roughly classified into frequency recovery (correction) processing and phase recovery (correction) processing. The frequency recovery processing equalizes, that is, recovers modulation transfer function (MTF) characteristics deteriorated by an optical system, and the phase recovery processing equalizes, that is, recovers phase transfer function (PTF) characteristics deteriorated by an optical system.

Intuitively, the phase recovery processing moves an image in a frequency-dependent manner so as to return an asymmetrical PSF shape to as symmetrical a shape as possible.

While the frequency recovery processing and the phase recovery processing can be applied simultaneously as signal processing, either correction may be performed by changing a design method of a filter coefficient.

Various methods for this kind of point image restoration processing have been suggested.

JP2011-124692A discloses an image processing device which, in order to suppress amplification of in noise due to image recovery processing, or the like, performs recovery processing on an amplitude component and a phase component of an input image to generate a first image, performs recovery processing only on the phase component of the input image to generate a second image, acquires difference information between the generated first and second images, and synthesizes the difference information with the second image according to an appropriate recovery intensity adjustment coefficient to generate a recovery adjusted image.

JP2011-059813A discloses an image processing device which performs image recovery for an image subjected to nonlinear correction using blind deconvolution. This image processing device comprises a correction unit which performs correction for reducing nonlinear gradation correction for a captured image subjected to nonlinear gradation correction, and an image recovery unit which performs image recovery by applying blind deconvolution to the captured image with reduced gradation correction.

JP2013-020610A discloses an image processing device which reduces over-recovery of image data by image recovery processing. In this image processing device, image recovery processing is performed for color image data in an RGB format before gamma processing, the difference between amplification and attenuation of a pixel signal value by gamma correction is absorbed, and a limit value of a variation is calculated such that the maximum value of the variation of the pixel signal value becomes constant even after gamma correction. With this, the technical problems in that "a situation in which a deterioration state of image data actually obtained does not match a deterioration state of image data to be recovered by an image recovery filter occurs due to a saturated pixel", and "image quality deterioration, such as undershoot or overshoot, occurs in an edge portion, and in particular, undershoot in a low brightness portion is amplified by gamma processing after image recovery processing" have been solved.

The point spread function of the optical system is used in a restoration technique of an image with an extended depth of focus, and JP2012-049759A discloses an imaging module which executes image restoration in a short period of time with excellent accuracy. In this imaging module, restoration processing is applied to a brightness signal after synchronization processing (demosaic processing), whereby it is not necessary to separately provide parameters of the restoration processing for RGB, and it is possible to accelerate the restoration processing. Furthermore, adjacent pixels are put together in a predetermined unit and the common restoration processing parameters are applied to this unit to perform a deconvolution processing, whereby the accuracy of the restoration processing is improved.

SUMMARY OF THE INVENTION

The above-described point image restoration processing is processing for restoring an image blurred due to the point spread phenomenon (optical characteristics) by the optical system, to an original sharp image, and is a technique for acquiring a recovered image with image quality deterioration eliminated or improved by applying the restoration filter based on the point spread function to source image data with deteriorated image quality.

Accordingly, in order to obtain a recovered image in which an object image is faithfully reproduced, "assumed image quality deterioration characteristics of the restoration filter" for use in the point image restoration processing needs to appropriately match "actual image quality deterioration characteristics of source image data".

That is, if image quality deterioration caused by an optical system is exactly ascertained, a restoration filter capable of strictly eliminating such image quality deterioration is designed, and image quality deterioration (point spread phenomenon) due to the optical system is accurately reflected in source image data, in principle, it is possible to obtain "a high-quality image in which an object image is faithfully reproduced" from "a captured image with deteriorated image quality".

However, "the characteristics of the restoration filter" may not appropriately match "image quality deterioration of source image data" depending on the characteristics of the object image or imaging equipment.

For example, source image data fluctuates in image quality depending on the imaging ability of the imaging element, and in a case where the object image is very bright, a pixel saturation phenomenon may occur in the imaging element. In a case where pixel saturation occurs, an image waveform profile in this saturated portion is clipped or the like; thus, the obtained source image data is not always subjected to the image quality deterioration characteristics of the lens optical system faithfully.

In this way, source image data to be subjected to the restoration processing is affected by not only the deterioration characteristics resulting from the optical system but also the nonlinear deterioration characteristics resulting from the imaging element or pre-stage nonlinear signal processing, and in particular, in a case where the contrast of the object image is high, unexpected image quality deterioration may occur.

Accordingly, even if the characteristics of the optical system are sufficiently analyzed and a restoration filter capable of suppressing the influence of the point spread phenomenon is designed, "the characteristics of the restoration filter" may not appropriately match "image quality deterioration of source image data" depending on the object image.

If the restoration processing is performed under conditions in which "the characteristics of the restoration filter" may not appropriately match "image quality deterioration of source image data", image quality deterioration is not sufficiently eliminated, and a high-quality recovered image is not obtained. In some cases, image quality deterioration is promoted, and ringing or the like is conspicuous in a recovered image.

The degree of image quality deterioration (ringing) occurring in the recovered image depends on various factors. For example, the image quality of the recovered image after the point image restoration processing fluctuates due to the influence of the characteristics of the restoration filter for use in the restoration processing, the data characteristics of source image data, to which the restoration processing is applied, or other kinds of image processing performed before and after the restoration processing. Accordingly, in order to more effectively prevent or reduce image quality deterioration in the recovered image, a restoration processing method integrally in consideration of various characteristics is required. In particular, in a case where various object images are captured, image data characteristics to be subjected to the restoration processing is not constant, and images having various characteristics, such as an image having high contrast as a whole or locally, a color-shifted image, and an image with some pixel values in a saturated state, will be subjected to the restoration processing. Therefore, a restoration processing method which is excellent in image toughness to flexibly cope with an image to be processed having various characteristics is required.

On the other hand, in the frequency recovery (correction) processing, in many cases, the degree of correction for an edge portion of an image is large and overshoot and/or undershoot occurs near the edge slightly in contrast to the phase recovery (correction) processing. The reasons for this are as follows.

(1) Divergence of frequency characteristics due to deviation of imaging conditions, such as a lens manufacturing variation and an object distance, from assumed imaging conditions.

(2) Frequency characteristics change in a pre-stage of recovery processing with linearity of an imaging element or (in a case of a circuit configuration in which a recovery filter processing is performed after demosaicing processing) since nonlinear processing, such as demosaicing processing, is performed.

(3) The number of taps of a recovery filter is insufficient, and frequency characteristics of the recovery filter diverge from desired frequency characteristics.

In many case, while overshoot/undershoot occurring near the edge due to the frequency recovery processing described above is inconspicuous alone, in a case where gamma correction is performed in a post-stage, in general, since the gamma correction greatly enhances the amplitude of the low brightness side, there is a problem in that overshoot/undershoot becomes conspicuous artifact.

If the phase recovery processing is performed after the gamma correction, a correction effect may be weakened with change in frequency characteristics of an image due to the gamma correction.

The inventions described in JP2011-124692A, JP2011-059813A, JP2013-020610A, and JP2012-049759A cannot solve the above-described problems, and in JP2011-124692A, JP2011-059813A, JP2013-020610A, and JP2012-049759A described above, there is no description of the above-described problems, and there is no suggestion relating to "an image processing method which integrally considers various factors in the processing before and after the restoration processing as well as the restoration processing itself in the restoration processing using the point spread function and is excellent in image toughness to flexibly cope with a source image having various characteristics".

The invention has been accomplished in consideration of such a situation, and an object of the invention is to provide an image processing device, an imaging device, an image processing method, and non-transitory computer readable recording medium storing an image processing program capable of, when recovering a deteriorated image due to a point spread function of an optical system, effectively performing phase recovery and suppressing the occurrence of artifact due to frequency recovery processing.

In order to attain the above-described object, an image processing device according to an aspect of the invention comprises a phase recovery processing unit which subjects image data acquired from an imaging element by capturing an object image using an optical system to phase recovery processing using a phase recovery filter based on a point spread function of the optical system, a gradation correction processing unit which subjects image data subjected to the phase recovery processing to nonlinear gradation correction, and a frequency recovery processing unit which subjects image data subjected to the gradation correction to frequency recovery processing using a frequency recovery filter based on the point spread function of the optical system.

According to the aspect of the invention, two kinds of recovery processing including the phase recovery processing using the phase recovery filter based on the point spread function of the optical system and the frequency recovery processing using the frequency recovery filter based on the point spread function of the optical system are executed in two steps for image data acquired from the imaging element. In particular, the phase recovery processing is performed before the gradation correction for gradation-correcting image data nonlinearly, and the frequency recovery processing is performed after the phase recovery processing and the gradation correction.

Ideally, it is preferable that the frequency recovery processing and the phase recovery processing are performed before the nonlinear gradation correction. The reason for this is that the frequency characteristics of the image changes nonlinearly with the nonlinear gradation correction, and thus, theoretically, if the restoration processing is not performed before the gradation correction, accurate correction cannot be executed.

In the invention, of the frequency recovery processing and the phase recovery processing, the phase recovery processing is performed before the gradation correction, and the frequency recovery processing is performed after the gradation correction. Since the phase recovery processing is performed before the gradation correction (before the frequency characteristic of the image changes), it is possible to effectively perform phase recovery. Furthermore, since the frequency recovery processing is performed after the gradation correction, overshoot/undershoot slightly occurring due to the frequency recovery processing is not amplified (enhanced) by the gradation correction, and it is possible to prevent the occurrence of strong artifact.

It is preferable that the image processing device according to another aspect of the invention further comprises a storage unit which stores the phase recovery filter and the frequency recovery filter, the phase recovery processing unit reads the phase recovery filter from the storage unit and uses the phase recovery filter in the phase recovery processing, and the frequency recovery processing unit reads the frequency recovery filter from the storage unit and uses the frequency recovery filter in the frequency recovery processing. The phase recovery filter and the frequency recovery filter are stored in the storage unit, whereby it is possible to reduce computational costs for generating a phase recovery filter and a frequency recovery filter during recovery processing.

The image processing device according to still another aspect of the invention may further comprise a storage unit which stores the point spread function of the optical system, an optical transfer function obtained by Fourier-transforming the point spread function, or a modulation transfer function indicating an amplitude component of the optical transfer function and a phase transfer function indicating a phase component of the optical transfer function, the phase recovery processing unit may read the point spread function, the optical transfer function, or the phase transfer function from the storage unit, may generate the phase recovery filter, and may use the generated phase recovery filter in the phase recovery processing, and the frequency recovery processing unit may read the point spread function, the optical transfer function, or the modulation transfer function from the storage unit, may generate the frequency recovery filter, and may use the generated frequency recovery filter in the frequency recovery processing.

In the image processing device according to still another aspect of the invention, it is preferable that the phase recovery processing unit subjects image data acquired from the imaging element, which is image data for each color channel, to phase recovery processing using a phase recovery filter, and the frequency recovery processing unit subjects the image data subjected to the gradation correction, which is image data for each color channel, to frequency recovery processing using a frequency recovery filter.

According to still another aspect of the invention, it is possible to perform the phase recovery processing reflecting the phase transfer function (PTF) of each color channel, thus, to correct various chromatic aberrations, such as chromatic aberration of magnification and axial chromatic aberration, and to perform the frequency recovery processing reflecting the modulation transfer function (MTF) of each color channel.

In the image processing device according to still another aspect of the invention, it is preferable that the phase recovery processing unit subjects image data acquired from the imaging element, which is image data for each color channel, to phase recovery processing using a phase recovery filter, and the frequency recovery processing unit subjects image data subjected to gradation correction by the gradation correction processing unit, which is image data indicating a brightness component generated from image data for each color channel, to frequency recovery processing using the frequency recovery filter.

According to still another aspect of the invention, it is possible to perform the phase recovery processing reflecting the PTF of each color channel and to perform the frequency recovery processing for image data (image data of one channel) indicating the brightness component, whereby it is possible to reduce computational costs (circuit scale) with a decrease in the number of channels.

In the image processing device according to still another aspect of the invention, it is preferable that the phase recovery processing unit subjects image data acquired from the imaging element, which is image data indicating a brightness component generated from image data for each color channel, to phase recovery processing using the phase recovery filter, and the frequency recovery processing unit subjects the image data subjected to the gradation correction, which is image data indicating a brightness component generated from image data for each color channel, to frequency recovery processing using the frequency recovery filter. Since the phase recovery processing and the frequency recovery processing are respectively performed for image data indicating the brightness component of one channel, it is possible to minimize computational costs (circuit scale).

It is preferable that the image processing device according to still another aspect of the invention further comprises a brightness data generation unit which generates brightness data indicating a brightness component from image data for each color channel acquired from the imaging element, the phase recovery processing unit subjects brightness data generated by the brightness data generation unit to phase recovery processing using the phase recovery filter, the gradation correction processing unit subjects the brightness data subjected to the phase recovery processing to nonlinear gradation correction, and the frequency recovery processing unit subjects the brightness data subjected to the gradation correction to frequency recovery processing using the frequency recovery filter.

In the image processing device according to still another aspect of the invention, the gradation correction processing unit is a gamma correction processing unit which subjects the image data to gradation correction by logarithmic processing. The "logarithmic processing" used herein is processing for converting data expressed by antilogarithm to data expressed by logarithm, and in this application, further includes, for example, gamma correction processing or the like which is performed for image data. That is, the "logarithmic processing" also indicates that image data is converted to image data expressed by logarithm and the gamma correction processing as one gradation processing is performed for image data.

In the image processing device according to still another aspect of the invention, it is preferable that the bit length of the image data subjected to phase recovery processing by the phase recovery processing unit is greater than the bit length of the image data subjected to frequency recovery processing by the frequency recovery processing unit. If the bit length of image data is large, it is possible to perform image processing with higher accuracy, and in particular, if the bit length of image data before the nonlinear gradation correction is large, it is possible to perform the gradation correction more smoothly during the gradation correction.

In the image processing device according to still another aspect of the invention, the optical system has a lens unit which enlarges a depth of field by modulating a phase. According to this aspect, for image data obtained through a so-called extended depth of field (focus) (EDoF) optical system, it is possible to perform the restoration processing based on the point spread function with excellent accuracy. A method (optical phase modulation means) of modulating the phase in the lens unit is not particularly limited, and a phase modulation unit may be provided between lenses, or a phase modulation function may be provided to a lens itself (for example, an incident surface and/or an output surface of the lens).

An imaging device according to still another aspect of the invention comprises an imaging element which outputs image data by capturing an object image using an optical system, and the above-described image processing device.

An image processing method according to still another aspect of the invention comprises a step of subjecting image data acquired from an imaging element by capturing an object image using an optical system to phase recovery processing using a phase recovery filter based on a point spread function of the optical system, a step of subjecting image data subjected to the phase recovery processing to nonlinear gradation correction, and a step of subjecting image data subjected to the gradation correction to frequency recovery processing using a frequency recovery filter based on the point spread function of the optical system.

Non-transitory computer readable recording medium storing an image processing program according to still another aspect of the invention causes a computer to execute a step of subjecting image data acquired from an imaging element by capturing an object image using an optical system to phase recovery processing using a phase recovery filter based on a point spread function of the optical system, a step of subjecting image data subjected to the phase recovery processing to nonlinear gradation correction, and a step of subjecting image data subjected to the gradation correction to frequency recovery processing using a frequency recovery filter based on the point spread function of the optical system.

According to the invention, since the phase recovery processing using the phase recovery filter based on the point spread function of the optical system and the frequency recovery processing using the frequency recovery filter based on the point spread function of the optical system are executed in steps for image data acquired from the imaging element, and in particular, the phase recovery processing is performed before the gradation correction for gradation-correcting image data nonlinearly (before the frequency characteristics of the image change), it is possible to effectively perform phase recovery. Furthermore, since the frequency recovery processing is performed after the gradation correction, overshoot and/or undershoot slightly occurring due to the frequency recovery processing is not amplified (enhanced) by the gradation correction, and it is possible to prevent the occurrence of strong artifact.

DESCRIPTION OF THE PREFERRED EMBODIMENTS

An embodiment of the invention will be described referring to the accompanying drawings. In the following embodiment, as an example, a case where the invention is applied to a digital camera (imaging device) which is connectable to a computer (personal computer (PC)) will be described.

Figure 1:
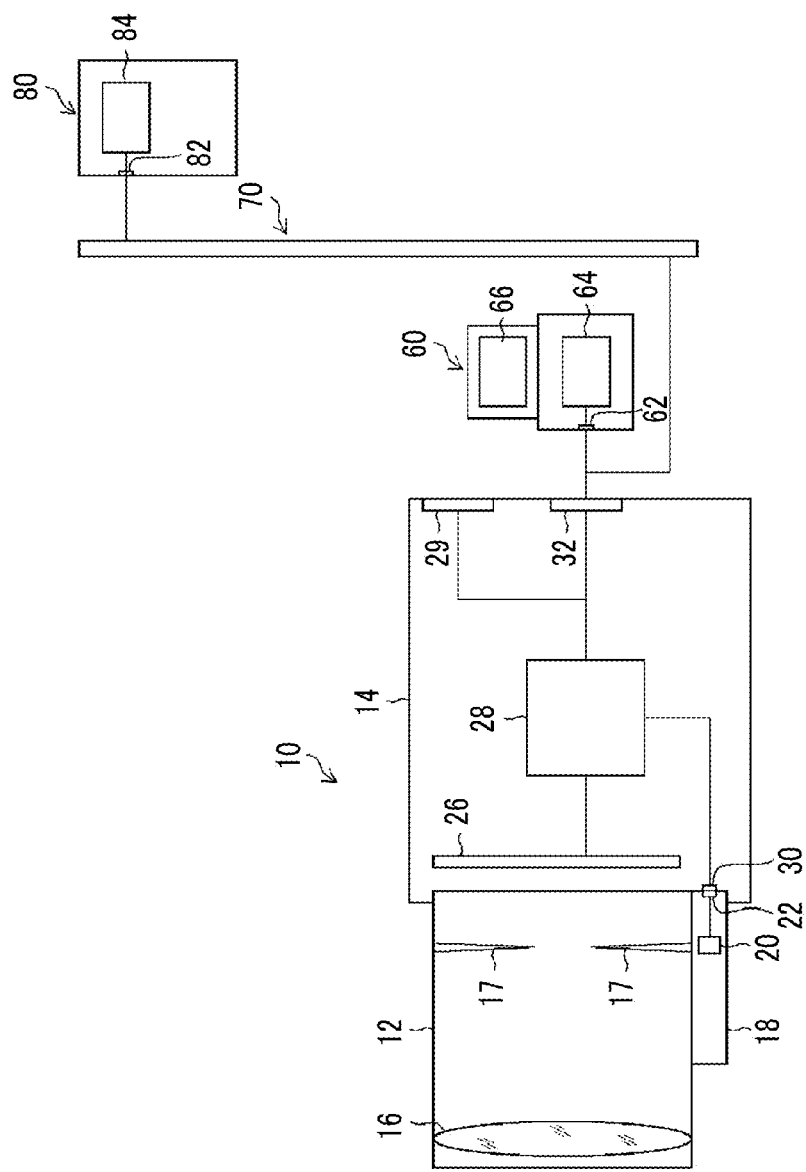
FIG. 1 is a block diagram showing a digital camera which is connected to a computer.

FIG. 1 is a block diagram showing a digital camera which is connected to a computer.

A digital camera 10 comprises an interchangeable lens unit 12, and a camera body 14 provided with an imaging element 26, and the lens unit 12 and the camera body 14 are electrically connected through a lens unit input/output unit 22 of the lens unit 12 and a camera body input/output unit 30 of the camera body 14.

The lens unit 12 is provided with an optical system, such as a lens 16 or a diaphragm 17, and an optical system operating unit 18 which controls the optical system. The optical system operating unit 18 includes a lens unit controller 20 which is connected to the lens unit input/output unit 22, and an actuator (not shown) which operates the optical system. The lens unit controller 20 controls the optical system through an actuator based on a control signal sent from the camera body 14 through the lens unit input/output unit 22, and performs, for example, focus control or zoom control by lens movement, diaphragm amount control of the diaphragm 17, and the like.

The imaging element 26 of the camera body 14 has a condensing microlens, a color filter of R (red), G (green), B (blue), or the like, and an image sensor (a photodiode: a complementary metal oxide semiconductor (CMOS), a charge coupled device (CCD), or the like). The imaging element 26 converts light of an object image emitted through the optical system (the lens 16, the diaphragm 17, or the like) of the lens unit 12 to an electrical signal, and sends an image signal (source image data) to the camera body controller 28.

The imaging element 26 of this example outputs source image data through imaging of the object image using the optical system, and source image data is transmitted to an image processing unit of the camera body controller 28.

Figure 2:
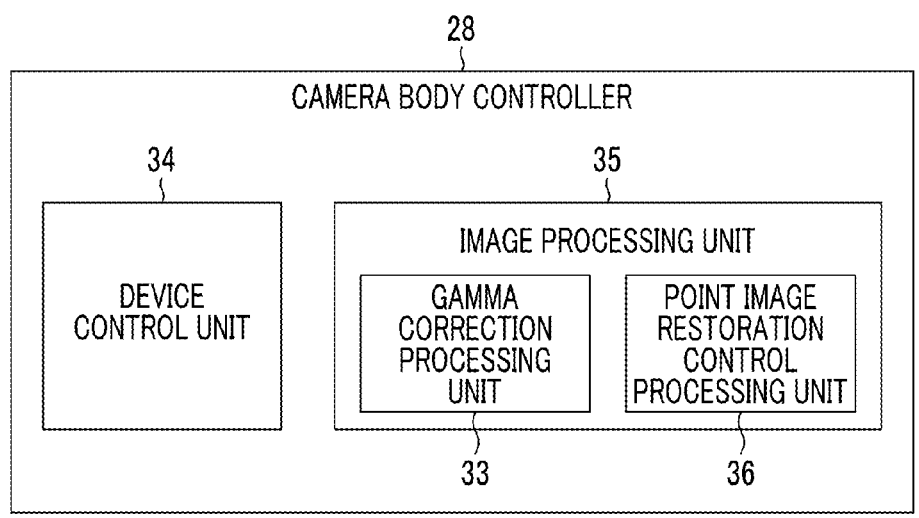
FIG. 2 is a block diagram showing a functional configuration example of a camera body controller.

As shown in FIG. 2, the camera body controller 28 has a device control unit 34 and an image processing unit (image processing device) 35, and integrally controls the camera body 14. For example, the device control unit 34 controls the output of the image signal (image data) from the imaging element 26, generates a control signal for controlling the lens unit 12 and transmits the control signal to the lens unit 12 (lens unit controller 20) through the camera body input/output unit 30, and transmits image data (RAW data, JPEG data, and the like) before and after image processing to external devices (a computer 60 and the like) connected through an input/output interface 32. The device control unit 34 appropriately controls various devices, such as a display unit (not shown) (an electronic view finder (EVF) or a rear liquid crystal display unit), in the digital camera 10.

The image processing unit 35 can subject an image signal from the imaging element 26 to arbitrary image processing as necessary. For example, various kinds of image processing, such as sensor correction processing, demosaic (synchronization) processing, pixel interpolation processing, color correction processing (offset correction processing, white balance processing, color matrix processing, gradation correction processing (gradation correction processing unit 33), and the like), RGB image processing (sharpness processing, tone correction processing, exposure correction processing, contour correction processing, and the like), RGB/YCrCb conversion processing, and image compression processing, are appropriately performed in the image processing unit 35. In particular, the image processing unit 35 of this example comprises a point image restoration control processing unit 36 which subjects an image signal (source image data) to restoration processing (point image restoration processing) based on a point spread function of the optical system. The details of the point image restoration processing will be described below.

The digital camera 10 shown in FIG. 1 is provided with other devices (a shutter and the like) necessary for imaging or the like, and the user can appropriately determine and change various settings (exposure value (EV value) and the like) for imaging through a user interface 29 in the camera body 14. The user interface 29 is connected to the camera body controller 28 (the device control unit 34 and the image processing unit 35), and various settings determined and changed by the user are reflected in various kinds of processing in the camera body controller 28.

Image data subjected to the image processing in the camera body controller 28 is sent to the computer 60 and the like through the input/output interface 32. The format of image data sent from the digital camera 10 (camera body controller 28) to the computer 60 and the like is not particularly limited, and may be an arbitrarily format, such as RAW, JPEG, or TIFF. Accordingly, the camera body controller 28 may constitute a plurality of pieces of associated data, such as header information (imaging information (imaging date and time, model, pixel number, diaphragm value, and the like)), main image data, and thumbnail image data, as one image file in association with one another, like a so-called exchangeable image file format (Exit), and may transmit the image file to the computer 60.

The computer 60 is connected to the digital camera 10 through the input/output interface 32 of the camera body 14 and a computer input/output unit 62, and receives data, such as image data, sent from the camera body 14. A computer controller 64 integrally controls the computer 60, and subjects image data from the digital camera 10 to image processing or performs communication control with a server 80 or the like connected to the computer input/output unit 62 through a network line, such as the Internet 70. The computer 60 has a display 66, and the processing content in the computer controller 64 is displayed on the display 66 as necessary. The user operates input means (not shown), such as a keyboard, while confirming the display of the display 66, thereby inputting data or commands to the computer controller 64. With this, the user can control the computer 60 or the devices (the digital camera 10 and the server 80) connected to the computer 60.

The server 80 has a server input/output unit 82 and a server controller 84. The server input/output unit 82 constitutes a transmission/reception connection unit with the external devices, such as the computer 60, and is connected to the computer input/output unit 62 of the computer 60 through the network line, such as the Internet 70. The server controller 84 cooperates with the computer controller 64 according to a control instruction signal from the computer 60, performs transmission/reception of data with the computer controller 64 as necessary, downloads data to the computer 60, and performs calculation processing and transmits the calculation result to the computer 60.

Each controller (the lens unit controller 20, the camera body controller 28, the computer controller 64, or the server controller 84) includes circuits necessary for control processing, and includes, for example, an arithmetic processing circuit (CPU or the like), a memory, and the like. Communication among the digital camera 10, the computer 60, and the server 80 may be performed in a wired manner or in a wireless manner. The computer 60 and the server 80 may be constituted integrally, and the computer 60 and/or the server 80 may be omitted. A communication function with the server 80 may be provided in the digital camera 10, and transmission/reception of data may be performed directly between the digital camera 10 and the server 80.

<Point Image Restoration Processing>

Next, point image restoration processing of captured data (image data) of an object image obtained through the imaging element 26 will be described.

In the following example, although an example where the point image restoration processing is carried out in the camera body 14 (the camera body controller 28) will be described, the whole or a part of the point image restoration processing can be carried out in another controller (the lens unit controller 20, the computer controller 64, the server controller 84, or the like).

The point image restoration processing of this example includes processing for subjecting source image data acquired from the imaging element 26 by capturing the object image using the optical system (the lens 16, the diaphragm 17, or the like) to phase recovery processing using a phase recovery filter based on a point spread function of the optical system to acquire recovered image data, and processing for subjecting source image data to frequency (amplitude) recovery processing using a frequency recovery filter based on the point spread function of the optical system to acquire recovered image data.

Figure 3:
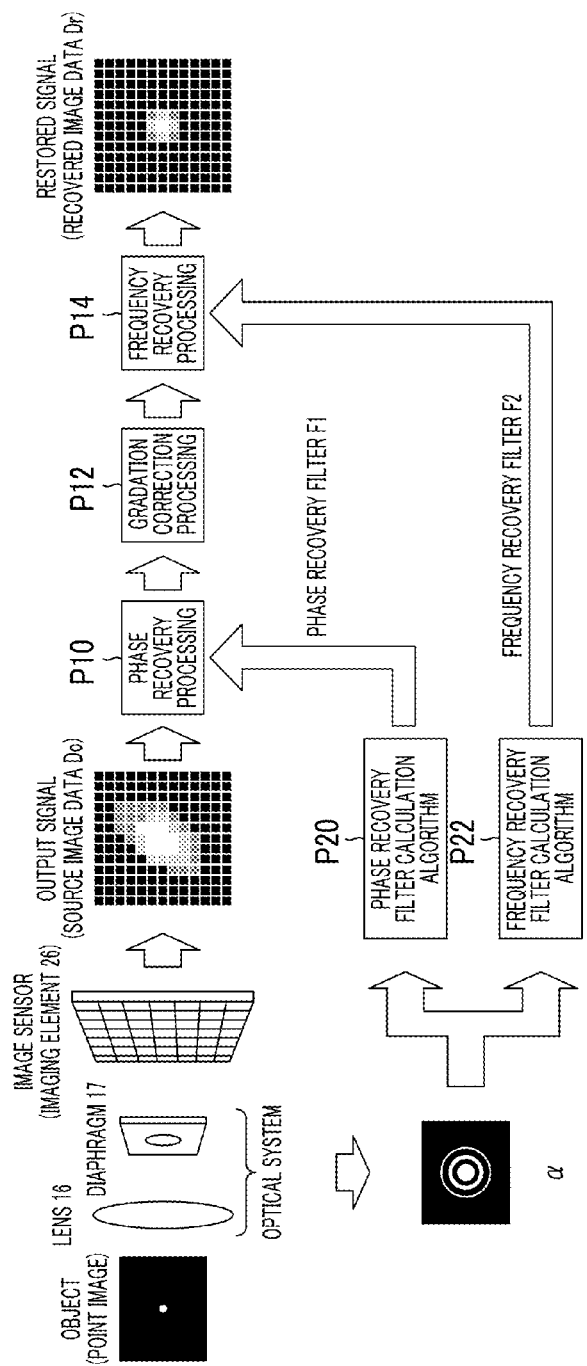
FIG. 3 is a diagram showing an outline from image capturing to point image restoration processing.

FIG. 3 is a diagram showing an outline from image capturing to the point image restoration processing.

As shown in FIG. 3, in a case where imaging is performed with a point image as an object, an object image is received by the imaging element 26 (image sensor) through the optical system (the lens 16, the diaphragm 17, or the like), and source image data Do is output from the imaging element 26. Source image data Do has an amplitude component and a phase component which are deteriorated by a point spread phenomenon resulting from the characteristic of the optical system, and the original object image (point image) becomes point-asymmetrical blurred image. In FIG. 3, symbol a represents point image information (point spread function) (for each diaphragm, each focal distance, and each image height) according to the imaging conditions.

The point image restoration processing of the blurred image is processing for determining the characteristic of deterioration (point spread function (PSF)/optical transfer function (OTF)) according to aberration or the like of the optical system and subjecting a captured image (deteriorated image) to restoration processing using a restoration (recovery) filter generated based on the PSF/OTF to restore a high-resolution image.

The PSF and the OTF have a relationship of Fourier conversion, the PSF is a real function, and the OTF is a complex function. As a function having information equivalent to the PSF and the OTF, a modulation transfer function or an amplitude transfer function (MTF) and a phase transfer function (PTF) are known and respectively indicate an amplitude component and a phase component of the OTF. The MTF and the PTF are combined to have the amount of information equivalent to the OTF or the PSF.

In general, in the restoration of the blurred image by the PSF, a convolution type Wiener filter can be used. A frequency characteristic $d(\omega_x, \omega_y)$ of the restoration filter can be calculated by the following expression with reference to the OTF obtained by Fourier-transforming PSF(x,y) and information of a signal to noise ratio (SNR).

$$d(\omega_x, \omega_y) = \frac{H^*(\omega_x, \omega_y)}{\|H(\omega_x, \omega_y)\|^2 + 1/SNR(\omega_x, \omega_y)} \quad \text{[Equation 1]}$$

In this expression, $H(\omega_x, \omega_y)$ represents the OTF, and $H^*(\omega_x, \omega_y)$ represents a complex conjugate thereof. Furthermore, $SNR(\omega_x, \omega_y)$ represents the SN ratio.

Design for the filter coefficient of the restoration filter is an optimization problem of selecting a coefficient value such that the frequency characteristic of the filter becomes closest to a desired Wiener frequency characteristic, and the filter coefficient is appropriately calculated by an arbitrary known method.

In this example, a phase recovery filter F1 for recovering deterioration of a phase characteristic is calculated by using the PTF indicating the phase component of the OTF instead of the OTF of the expression of [Equation 1], calculating the frequency characteristic of the filter, and selecting the coefficient value such that the calculated frequency characteristic of the filter becomes closest to the desired Wiener frequency characteristic. Similarly, a frequency recovery filter F2 for recovering deterioration of a frequency characteristic is calculated by using the MTF indicating the amplitude component of the OTF instead of the OTF of the expression of [Equation 1], calculating the frequency characteristic of the filter, and selecting the coefficient value such that the calculated frequency characteristic of the filter becomes closest to the desired Wiener frequency characteristic.

As shown in FIG. 3, in order to restore the original object image (point image) from source image data Do of the blurred image, source image data Do is subjected to phase recovery processing P10 using the phase recovery filter F1. A point-asymmetrical image is moved in a frequency-dependent manner and is recovered to a point-symmetrical image by the phase recovery processing P10.

Subsequently, image data after the phase recovery processing is subjected to nonlinear gradation correction processing P12 (gamma correction processing by logarithmic processing). The gradation (gamma) correction processing is processing for correcting image data nonlinearly such that an image is naturally reproduced by a display device.

Next, image data after the gradation correction processing is subjected to frequency recovery processing P14 using the frequency recovery filter F2. The point-symmetrical blurred image is frequency-recovered and becomes small by the frequency recovery processing P14. With this, recovered image data Dr representing an image (recovered image) closer to the original object image (point image) is obtained.

The phase recovery filter F1 used in the phase recovery processing P10 is obtained from point image information (PSF, OTF, or PTF) of the optical system according to the imaging conditions at the time of acquisition of source image data Do by a predetermined phase recovery filter calculation algorithm P20, and the frequency recovery filter F2 used in the frequency recovery processing P14 is obtained from the point image information (PSF, OTF, or MTF) of the optical system according to the imaging conditions at the time of acquisition of source image data Do by a predetermined frequency recovery filter calculation algorithm P22.

Since the point image information of the optical system fluctuates depending on various imaging conditions, such as a diaphragm amount, a focal distance, a zoom amount, an image height, a recording pixel number, and a pixel pitch, as well as the type of the lens 16, when calculating the phase recovery filter F1 and the frequency recovery filter F2, these imaging conditions are acquired.

Each of the phase recovery filter F1 and the frequency recovery filter F2 is a filter on an actual space constituted of, for example, N×M (where N and M are integers equal to or greater than two) taps, and is applied to image data to be processed. With this, weighted average calculation (deconvolution calculation) of a filter coefficient allocated to each tap and corresponding pixel data (pixel data to be processed of image data and adjacent pixel data) is performed, whereby pixel data after the recovery processing can be calculated. The weighted averaging processing using the phase recovery filter F1 and the frequency recovery filter F2 is applied to all pixel data constituting image data while changing a target pixel in order, thereby performing the point image restoration processing.

The phase recovery filter F1 or the frequency recovery filter F2 on the actual space constituted of N×M taps can be derived by inversely Fourier-transforming a phase characteristic of a recovery filter or a frequency amplitude characteristic of a recovery filter on a frequency space. Accordingly, the phase recovery filter F1 or the frequency recovery filter F2 on the actual space can be appropriately calculated by specifying a phase recovery filter or a frequency recovery filter on a frequency space as the basis and designating the number of taps constituting the phase recovery filter F1 or the frequency recovery filter F2 on the actual space. It is preferable that, in order to perform phase correction with excellent accuracy, the number of N×M taps of the phase recovery filter F1 is greater than the number of taps of the frequency recovery filter F2.

Next, an adverse effect in image quality caused by the point image restoration processing will be described.

Figure 4:
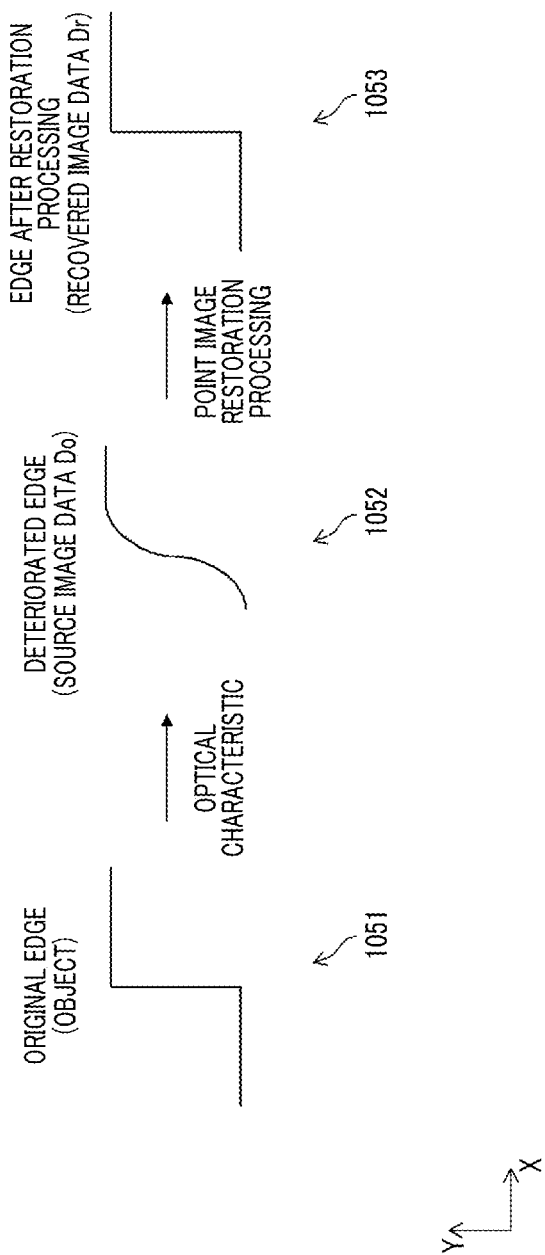
FIG. 4 is a diagram showing an example of a change in image quality of an edge portion (image boundary portion) in an object image, and shows a case where ideal point image restoration processing (no saturation of a pixel value and no clipping) is performed.

FIG. 4 is a diagram showing an example of a change in image quality of an edge portion (image boundary portion) in an object image, and shows a case where ideal point image restoration processing (no saturation of a pixel value and no clipping) is performed for phase-recovering and frequency-recovering source image data Do before nonlinear gradation correction. Reference numeral 1051 of FIG. 4 indicates contrast inherent in the object image, reference numeral 1052 indicates contrast in source image data Do before the point image restoration processing, and reference numeral 1053 indicates contrast in recovered image data Dr after the ideal point image restoration processing. The transverse direction (X direction) of FIG. 4 indicates a position (one-dimensional position) in the object image, and the longitudinal direction (Y direction) indicates strength of contrast.

As described above, "an edge portion having a difference in level of contrast" (see reference numeral 1051 of FIG. 4) in the object image has image blur in the captured image (source image data Do) due to the point spread phenomenon of the optical system at the time of imaging (see reference numeral 1052 of FIG. 4), and recovered image data Dr is obtained through the point image restoration processing (see reference numeral 1053 of FIG. 4).

In the point image restoration processing, in a case where the "actual image deterioration characteristics (image blur characteristics)" match "the point spread function (PSF or the like) as the basis of the recovery filter to be used", the image is appropriately restored, and recovered image data Dr in which the edge portion or the like is appropriately restored can be obtained (see FIG. 4).

However, in actual point image restoration processing, there may be a case where the "actual image deterioration characteristics (image blur characteristics)" do not completely match "the point spread function assumed by the recovery filter to be used".

Figure 5:
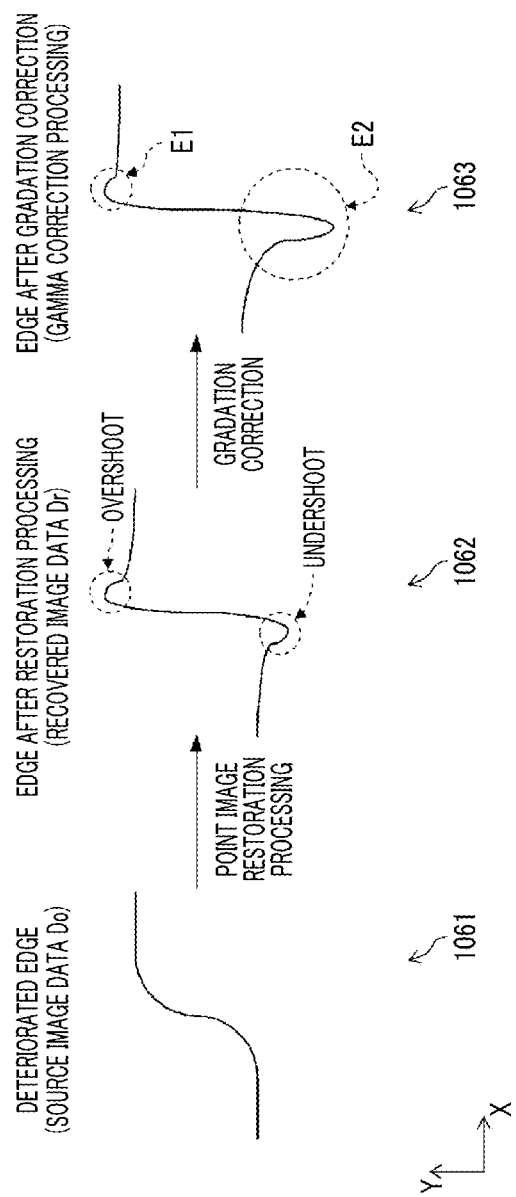
FIG. 5 is a diagram showing an example of source image data, recovered image data, and image data after gradation correction processing in a case where "actual image deterioration characteristics (image blur characteristics)" do not completely match "a point spread function as the basis of a restoration filter to be used".

FIG. 5 is a diagram showing an example of source image data, recovered image data subjected to the point image restoration processing using the restoration filter, and image data after the gradation correction processing in a case where the "actual image deterioration characteristics (image blur characteristics)" do not completely match "the point spread function assumed by the recovery filter to be used".

The transverse direction (X direction) in FIG. 5 indicates a position (one-dimensional position) in an image, and the longitudinal direction (Y direction) indicates a pixel value. In a case where the "actual image deterioration characteristics (image blur characteristics)" do not completely match "the point spread function assumed by the recovery filter to be used", overshoot or undershoot may occur in the edge portion where a contrast difference is comparatively great (see reference numerals 1061 and 1062 of FIG. 5). Even in a case where image quality deterioration, such as overshoot or undershoot), occurs, as long as the point image restoration processing is excellent in image reproducibility and image toughness (image invulnerability), recovered image data Dr in which image quality is recovered to such an extent that image quality deterioration is not visually recognized (inconspicuous) can be acquired.

However, even if recovered image data which has been recovered to such an extent that image quality deterioration is inconspicuous has been obtained through the point image restoration processing, image quality deterioration in recovered image data may be enhanced and made conspicuous through other kinds of processing (the gradation correction processing (the gamma correction processing or the like)) which are performed after the point image restoration processing.

For example, as shown in FIG. 5, even in a case where overshoot or undershoot itself caused by the point image restoration processing is small and the influence thereof is particularly inconspicuous visually, and if the gradation correction processing (the gamma correction processing) is performed subsequently, overshoot or undershoot may be enhanced unnecessarily (see "E1" and "E2" of reference numeral 1063 of FIG. 5). In particular, a great gain (amplification factor) is applied to an overshoot or undershoot portion on a shadow side through the subsequent gamma correction processing, and the overshoot or undershoot portion constitutes a portion which greatly inclines toward a black side in the image edge portion (see "E2" of reference numeral 1063 of FIG. 5). This phenomenon is not limited to the point image restoration processing, and is common for a case where overshoot occurs in the edge portion as a result of subjecting image data in a linear antilogarithm space to a contour correction processing.

Figure 6:
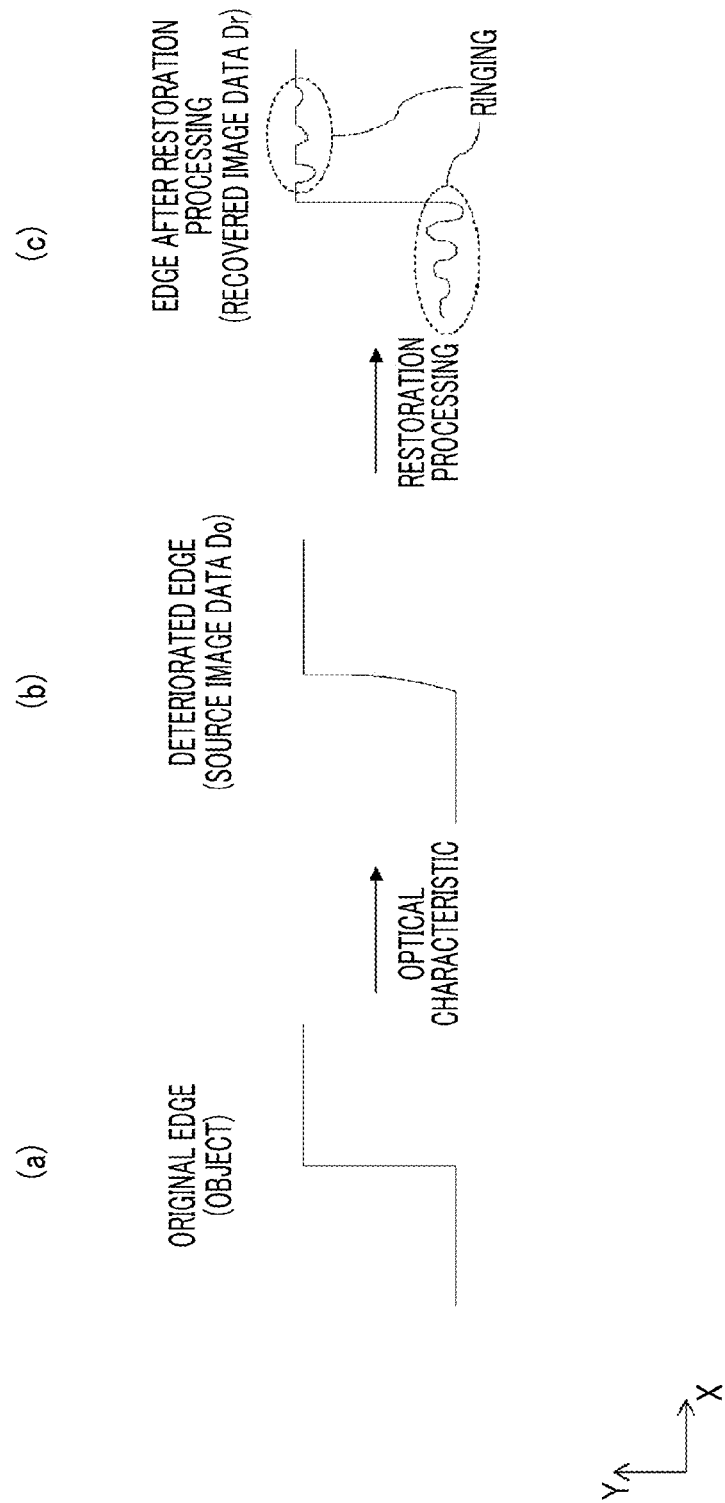
FIG. 6 is a diagram showing an example of change in contrast of an edge portion in an object image in actual point image restoration processing (with saturation of a pixel value and clipping), (a) of FIG. 6 shows contrast inherent in the object image, (b) of FIG. 6 shows contrast in source image data before point image restoration processing, and (c) of FIG. 6 shows contrast in recovered image data after point image restoration processing.

FIG. 6 shows an example of actual point image restoration processing (with saturation of a pixel value and clipping).

As described above, "an edge portion having a difference in level of contrast" (see (a) of FIG. 6) in the object image has image blur in the captured image (source image data Do) due to the point spread phenomenon of the optical system at the time of imaging (see (b) of FIG. 6), and recovered image data Dr is obtained by the point image restoration processing (see (c) of FIG. 6).

In the point image restoration processing, in a case where the "actual image deterioration characteristics (image blur characteristics)" match "the point spread function (PSF or the like) assumed by the restoration filter to be used", the image is appropriately restored, and recovered image data Dr in which the edge portion or the like is appropriately restored can be obtained (see FIG. 4).

However, in source image data including a pixel (saturated pixel) in which the pixel value is saturated, an image waveform in a saturated pixel portion is brought into a clipped state (see FIG. 6). In particular, since source image data of an edge portion including a saturated pixel has a waveform close to a step signal (see (b) of FIG. 6), change in contrast becomes extremely large which is not possible with the assumed point spread function, and as a result, data in which deterioration (image blur) is too small is obtained. In this way, in source image data including a saturated pixel, deviation from original image data (object image) occurs due to clipping of pixel data. If source image data in which such data deviation occurs is subjected to restoration processing using a restoration filter, ringing is likely to occur due to excessive enhancement, and occurring ringing is likely to become complicated (see (c) of FIG. 6). Furthermore, a high frequency component increases, and wraparound noise is likely to be enhanced.

Accordingly, in a case of actually designing the point image restoration processing as a part of the image processing flow, it is preferable to design an overall image processing flow in consideration of not only the point image restoration processing itself but also the relevance to the processing before and after the point image restoration processing.

In a case of performing gradation correction by the logarithmic processing (the gamma correction processing), a frequency recovery filter itself may have a filter coefficient corresponding to image data before the logarithmic processing, or may have a filter coefficient corresponding to image data after the logarithmic processing.

In a case where recovery processing (frequency recovery processing) is performed by intentionally applying "a frequency recovery filter having a filter coefficient corresponding to a pixel value (antilogarithm pixel data) before gradation correction (before the logarithmic processing)" to "a pixel value (logarithm pixel data) of image data after gradation correction (after the logarithmic processing)", toughness for image quality deterioration (ringing or the like) occurring in a recovered image (restored image) can be improved, and ringing can be made inconspicuous on the recovered image. This is because, in pixel data (image data) after the logarithmic processing, the gradation of the low brightness portion is enhanced and the gradation of the high brightness portion is not enhanced.

Figure 7:
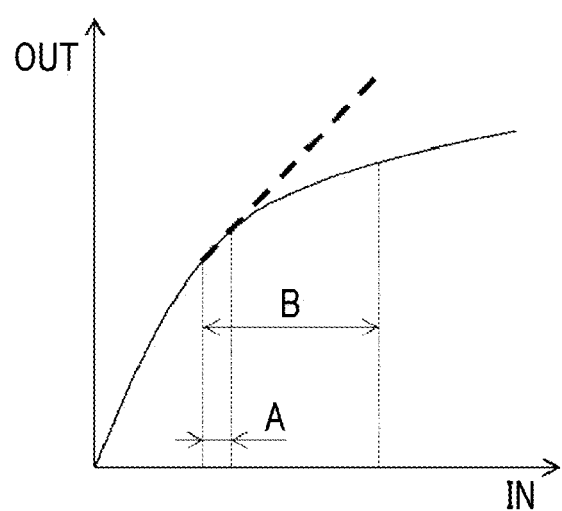
FIG. 7 is a diagram (graph) showing an example of the relationship between pre-processing data and post-processing data by gamma processing (gradation processing in logarithmic processing).

FIG. 7 is a diagram (graph) showing an example of the relationship between pre-processing data and post-processing data by the gamma processing (the gradation processing in the logarithmic processing). The horizontal axis of FIG. 10 indicates pre-processing data (gamma processing input data "IN"), the vertical axis indicates post-processing data (gamma processing output data "OUT"), and a solid line in the graph indicates a gamma processing gradation curve.

In general point image restoration processing for image data, a region where the effect of the point image restoration processing is easily visually recognized is a region with low contrast, and is "a region with a comparatively small level difference of the pixel value" to be approximated linearly in the gamma processing gradation curve (see "A" of FIG. 7). Meanwhile, in a region with high contrast, that is, in "a region with a comparatively great level difference of the pixel value" constituting a curved portion in the gamma processing gradation curve, original contrast is high and blur is hardly recognized (see "B" of FIG. 7).

In addition, in a region including a saturated pixel out of the region with high contrast, if the point image restoration processing (frequency recovery processing) is performed for pixel data (pixel data before gradation correction) whose pixel value is antilogarithm, and then gradation correction (the gamma correction processing, that is, the gradation processing in the logarithmic processing) is performed, undershoot/overshoot (ringing) is likely to be conspicuous. In contrast, in a case where the frequency recovery processing is performed for pixel data after the logarithmic processing, high contrast is compressed through the logarithmic processing, and intensity of ringing due to the frequency recovery processing is reduced.

That is, the recovery processing (frequency recovery processing) is performed for pixel data after the logarithmic processing using the frequency recovery filter having the filter coefficient corresponding to pixel data whose pixel value is antilogarithm, whereby it is possible to carry out the frequency recovery processing for the low contrast region, which is generally likely to be visually recognized, with no deterioration, and it is possible to reduce the degree of enhancement of ringing in the high contrast region where ringing is likely to occur due to the frequency recovery processing.

In particular, in a case where the image processing device (imaging device or the like) can execute a plurality of kinds of gradation correction (gamma correction processing) and stores data of a plurality of kinds of gamma processing gradation curves, in the related art (see JP2013-020610A), it is necessary to calculate the limit value of the variation of the pixel signal value for each of a plurality of types of gradation correction. However, according to this system, since the frequency recovery processing is applied to pixel data after gradation correction, switching of the processing according to the type of gradation correction is not required.

In general, the point spread function (PSF) is based on the assumption that the input is linear, and a restoration filter based on the assumption is easily generated using a "linear coefficient", that is, "a filter coefficient corresponding to antilogarithm pixel data".

In this way, this system is very effective and useful for practical use.

Meanwhile, the recovery processing (frequency recovery processing) is performed for the pixel value (logarithm pixel data) after gradation correction (the logarithmic processing) using the frequency recovery filter having the filter coefficient corresponding to the pixel value (logarithm pixel data) after the logarithmic processing, whereby it is possible to improve toughness with respect to image quality deterioration due to ringing caused by the frequency recovery processing, and to make caused ringing inconspicuous on the image.

That is, in a case where pixel data has the pixel value (logarithm pixel data) after gradation correction (the logarithmic processing), the frequency recovery processing is performed using the frequency recovery filter having the filter coefficient corresponding to the pixel value (logarithm pixel data) after the logarithmic processing, whereby it is possible to accurately perform the frequency recovery processing itself. In this case, target image data of the frequency recovery processing is set to "source image data after gradation correction", high contrast is compressed through gradation correction (the logarithmic processing), and it is possible to reduce strength of ringing caused by the frequency recovery processing.

The frequency recovery filter for use in the frequency recovery processing may be generated in advance, or may be successively calculated and generated according to the execution of the frequency recovery processing. From the viewpoint of reducing the calculation amount during the frequency recovery processing, it is preferable that the frequency recovery filter is generated in advance. Furthermore, from the viewpoint of using the frequency recovery filter excellent in adaptability, it is preferable that the frequency recovery filter is successively calculated at the time of the execution of the frequency recovery restoration processing.

In a case where the frequency recovery filter is generated in advance, the filter coefficient of the frequency recovery filter may be determined by performing calculation based on the pixel value determined through the logarithmic processing (the gamma correction processing) for the input pixel value (input image data). The pixel value which is used for generating the frequency recovery filter may be a brightness value or a pixel value (for example, the pixel value of G) relating to one channel representatively selected among RGB color data. Furthermore, the pixel value which is used for generating the frequency recovery filter may be a pixel value of a main object, or may be a pixel value which is determined from the average value of the entire image.

First Embodiment

Figure 8:
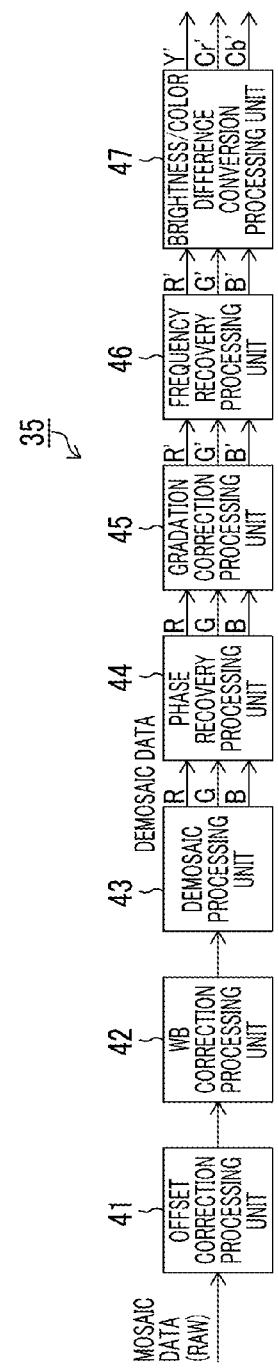
FIG. 8 is a block diagram showing a first embodiment of an image processing unit as an image processing device according to the invention.

FIG. 8 is a block diagram showing a first embodiment of an image processing unit 35 (camera body controller 28) as an image processing device according to the invention.

The image processing unit 35 of the first embodiment comprises an offset correction processing unit 41, a WB correction processing unit 42 which adjusts white balance (WB), a demosaic processing unit 43, a phase recovery processing unit 44, a gradation correction processing unit 45 including a gamma correction processing unit, a frequency recovery processing unit 46, and a brightness/color difference conversion processing unit 47 corresponding to a form of a brightness data generation unit. The phase recovery processing unit 44 and the frequency recovery processing unit 46 correspond to the point image restoration control processing unit 36 in the image processing unit 35 shown in FIG. 2.

In FIG. 8, the offset correction processing unit 41 receives mosaic data (RAW data: color data (RGB data) in a mosaic pattern of red (R), green (G), and blue (B)) before image processing acquired from the imaging element 26 in a dot sequence as input. Mosaic data is, for example, data (data having two bytes per pixel) having the bit length of 12 bits (0 to 4095) for each of RGB.

The offset correction processing unit 41 is a processing unit which corrects a dark current component included in input mosaic data, and performs offset correction of mosaic data by subtracting the signal value of optical black (OB) obtained from a light shielding pixel on the imaging element 26 from mosaic data.

Mosaic data (RGB data) subjected to the offset correction is applied to the WB correction processing unit 42. The WB correction processing unit 42 multiplies RGB data by a WB gain set for each color of RGB and performs white balance correction of RGB data. In regard to the WB gain, for example, a light source type is automatically determined based on RGB data or a light source type is manually selected, and the WB gain suitable for the determined or selected light source type is set; however, the setting method of the WB gain is not limited thereto, and the WB gain can be set by other known methods.

The demosaic processing unit 43 is a unit which performs demosaic processing (also referred to as "synchronization processing") to calculate all kinds of color information for each pixel from a demosaic image corresponding to a color filter array of the single plate type imaging element 26, and for example, in a case of an imaging element having color filters of three colors of RGB, calculates color information of all of RGB for each pixel from a mosaic image made of RGB. That is, the demosaic processing unit 43 generates image data of three phases of RGB synchronized from mosaic data (RGB data in a dot sequence).

RGB data subjected to the demosaic processing is applied to the phase recovery processing unit 44, and the phase recovery processing of RGB data is performed in the phase recovery processing unit 44.

Figure 9:
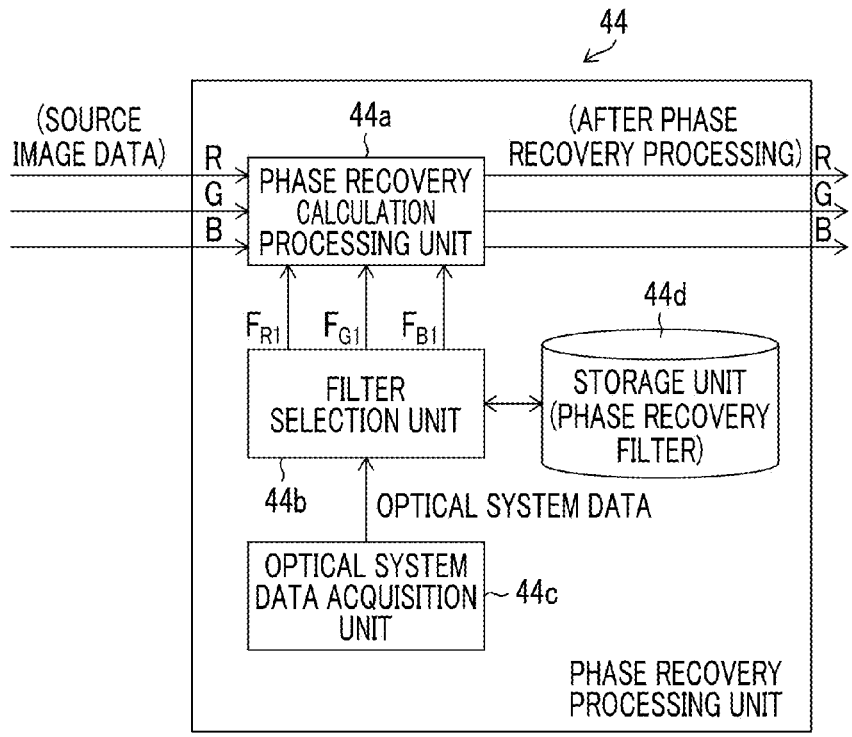
FIG. 9 is a block diagram showing an embodiment of a phase recovery processing unit in the image processing unit.

FIG. 9 is a block diagram showing an embodiment of the phase recovery processing unit 44.

The phase recovery processing unit 44 has a phase recovery calculation processing unit 44a, a filter selection unit 44b, an optical system data acquisition unit 44c, and a storage unit 44d.

The optical system data acquisition unit 44c acquires optical system data indicating the point spread function of the optical system (the lens 16, the diaphragm 17, or the like). Optical system data is data which is the selection criterion for a phase recovery filter in the filter selection unit 44b, and may be information which directly or indirectly indicates a point spread function of an optical system used at the time of capturing and acquiring source image data to be processed. Accordingly, for example, a transfer function (PSF, OTF (MTF, PTF)) itself relating to the point spread function of the optical system may be used as optical system data, or the type of the optical system (for example, the model number or the lens unit 12 (lens 16) or the like used at the time of imaging) indicating indirectly indicating a transfer function relating to the point spread function of the optical system, or the like may be used as optical system data.

The storage unit 44d stores a phase recovery filter ($F_{R1}$, $F_{G1}$, $F_{B1}$) of each of RGB generated based on the transfer functions (PSF, OTF, or PTF) relating to the point spread functions of a plurality of kinds of optical systems. The reason that the phase recovery filter ($F_{R1}$, $F_{G1}$, $F_{B1}$) is stored for each of RGB is that the aberration of the optical system is different (the PSF shape is different) depending on the wavelength of each color of RGB. It is preferable that the storage unit 44d stores the phase recovery filter ($F_{R1}$, $F_{G1}$, $F_{B1}$) corresponding to F number, a focal distance, an image height, or the like. This is because the PSF shape is different depending on these conditions.

The filter selection unit 44b selects a phase recovery filter corresponding to optical system data of the optical system used in capturing and acquiring source image data from the phase recovery filters stored in the storage unit 44d based on optical system data acquired by the optical system data acquisition unit 44c. The phase recovery filter ($F_{R1}$, $F_{G1}$, $F_{B1}$) of each of RGB selected by the filter selection unit 44b is sent to the phase recovery calculation processing unit 44a.

While the filter selection unit 44b ascertains type information (phase recovery filter storage information) of the phase recovery filter stored in the storage unit 44d, a method of ascertaining the phase recovery filter storage information by the filter selection unit 44b is not particularly limited. For example, the filter selection unit 44b may have a storage unit (not shown) which stores the phase recovery filter storage information, and in a case where the type information of the phase recovery filter stored in the storage unit 44d is changed, the phase recovery filter storage information stored in the storage unit of the filter selection unit 44b may be changed. The filter selection unit 44b may be connected to the storage unit 44d and may directly ascertain "information of the phase recovery filter stored in the storage unit 44d", or may ascertain the phase recovery filter storage information from a different processing unit (memory or the like) which ascertains the phase recovery filter storage information.

The filter selection unit 44b may select a phase recovery filter corresponding to the PSF of the optical system used in capturing and acquiring source image data, and a selection method of the phase recovery filter is not particularly limited. For example, in a case where optical system data from the optical system data acquisition unit 44c directly indicates the PSF, the filter selection unit 44b selects a phase recovery filter corresponding to the PSF indicated by optical system data. In a case where optical system data from the optical system data acquisition unit 44c indirectly indicates the PSF, the filter selection unit 44b selects a phase recovery filter corresponding to the PSF of the optical system used in capturing and acquiring source image data from "optical system data indirectly indicating the PSF".

Source image data (RGB data) subjected to the demosaic processing is input to the phase recovery calculation processing unit 44a, and the phase recovery calculation processing unit 44a subjects RGB data to the phase recovery processing using the phase recovery filter ($F_{R1}, F_{G1}, F_{B1}$) selected by the filter selection unit 44b and calculates phase-recovered image data. That is, the phase recovery calculation processing unit 44a performs deconvolution calculation of the phase recovery filter ($F_{R1}, F_{G1}, F_{B1}$) and pixel data (pixel data to be processed and adjacent pixel data) of each of RGB corresponding to the phase recovery filter and calculates RGB data subjected to the phase recovery processing.

The phase recovery processing unit 44 configured as above can perform the phase recovery processing reflecting the phase transfer function (PTF) of each color channel of RGB, and can correct various chromatic aberrations, chromatic aberration of magnification and axial chromatic aberration. Since the phase recovery processing unit 44 subjects RGB data (that is, linear RGB data according to brightness of incident light on the imaging element 26) before the nonlinear gradation correction to the phase recovery processing using the phase recovery filter corresponding to linear data, it is possible to perform accurate phase recovery.

Returning to FIG. 8, RGB data subjected to the phase recovery processing by the phase recovery processing unit 44 is applied to the gradation correction processing unit 45.

The gradation correction processing unit 45 is a unit which subjects RGB data subjected to the phase recovery processing to the nonlinear gradation correction, for example, subjects input RGB data to the gamma correction processing by the logarithmic processing, and subjects RGB data to nonlinear processing such that an image is naturally reproduced by a display device.

Figure 10:
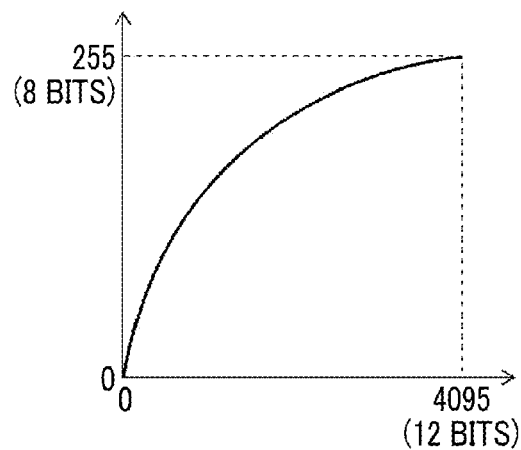
FIG. 10 is a graph showing an example of input/output characteristics (gamma characteristics) subjected to gradation correction by a gradation correction processing unit in the image processing unit.

FIG. 10 is a graph showing an example of input/output characteristics (gamma characteristics) subjected to the gradation correction by the gradation correction processing unit 45. In this example, the gradation correction processing unit 45 subjects 12-bit (0 to 4095) RGB data to gamma correction corresponding to the gamma characteristics to generate 8-bit (0 to 255) color data (1-byte data) of RGB. The gradation correction processing unit 45 can be constituted of, for example, a look-up table (LUT) of each of RGB, and preferably subjects each color of RGB data to the gamma correction. The gradation correction processing unit 45 includes processing for subjecting input data to nonlinear gradation correction along a tone curve.

R'G'B' data subjected to the gradation correction by the gradation correction processing unit 45 is applied to the frequency recovery processing unit 46, and the frequency recovery processing of R'G'B data is performed in the frequency recovery processing unit 46.

Figure 11:
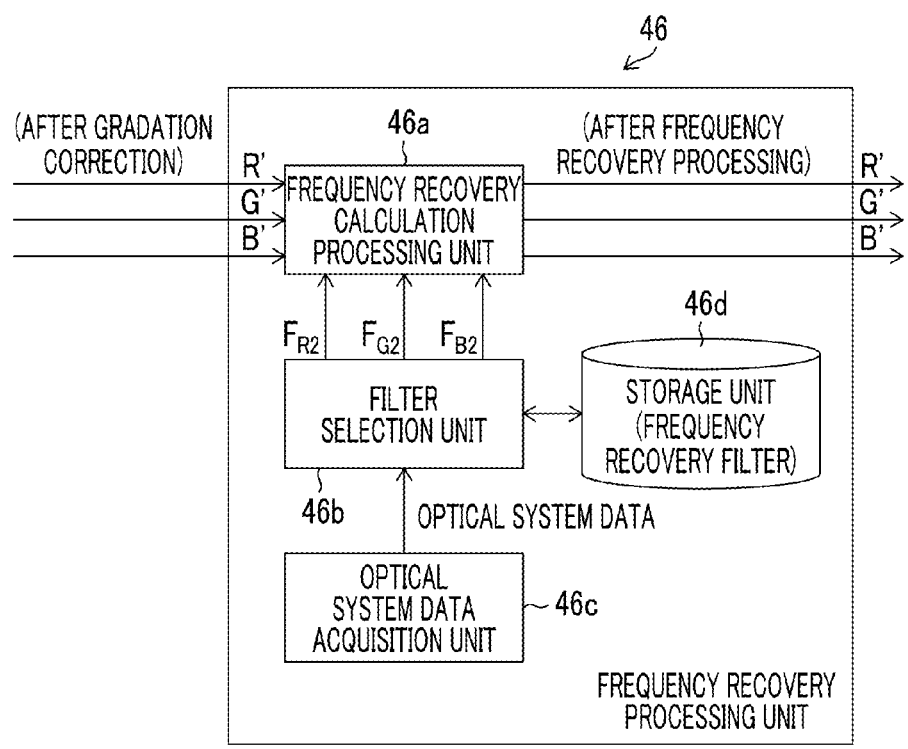
FIG. 11 is a block diagram showing an embodiment of a frequency recovery processing unit in the image processing unit.

FIG. 11 is a block diagram showing an embodiment of the frequency recovery processing unit 46.

The frequency recovery processing unit 46 has a frequency recovery calculation processing unit 46a, a filter selection unit 46b, an optical system data acquisition unit 46c, and a storage unit 46d.

The filter selection unit 46b and the optical system data acquisition unit 46c respectively correspond to the filter selection unit 44b and the optical system data acquisition unit 44c shown in FIG. 9, and thus, detailed description thereof will not be repeated.

The storage unit 46d stores a frequency recovery filter ($F_{R2}, F_{G2}, F_{B2}$) of each of RGB generated based on the PSF, the OTF, and the MTF of a plurality of kinds of optical systems. The reason that the frequency recovery filter ($F_{R2}, F_{G2}, F_{B2}$) of each of RGB is stored is that the aberration of the optical system is different (the PSF shape is different) depending on the wavelength of each color of RGB. It is preferable that the storage unit 46d stores the frequency recovery filter ($F_{R2}, F_{G2}, F_{B2}$) corresponding to F number, a focal distance, an image height, or the like. This is because the PSF shape is different depending on these conditions.

The filter selection unit 46b selects a frequency recovery filter corresponding to optical system data of the optical system used in capturing and acquiring source image data among the frequency recovery filters stored in the storage unit 46d based on optical system data acquired by the optical system data acquisition unit 46c. The frequency recovery filter ($F_{R2}, F_{G2}, F_{B2}$) of each of RGB selected by the filter selection unit 46b is sent to the frequency recovery calculation processing unit 46a.

R'G'B' data subjected to the gradation correction (gamma correction) is input to the frequency recovery calculation processing unit 46a, and the frequency recovery calculation processing unit 46a subjects R'G'B' data to the frequency recovery processing using the frequency recovery filter ($F_{R2}, F_{G2}, F_{B2}$) selected by the filter selection unit 46b and calculates frequency-recovered image data. That is, the frequency recovery calculation processing unit 46a performs deconvolution calculation of the frequency recovery filter ($F_{R2}, F_{G2}, F_{B2}$) and pixel data (pixel data to be processed and adjacent pixel data) of each of RGB corresponding to the frequency recovery filter and calculates R'G'B' data subjected to the frequency recovery processing.

The frequency recovery processing unit 46 configured as above can perform the frequency recovery processing reflecting the frequency transfer function (MTF) of each color channel of RGB. Since the frequency recovery processing is processing after the gradation correction, even if slight overshoot/undershoot occurs near the edge due to the frequency recovery processing, overshoot/undershoot is not amplified by the gradation correction and does not become conspicuous artifact (it is possible to suppress the occurrence of artifact due to the frequency recovery processing).

R'G'B' data subjected to the frequency recovery processing by the frequency recovery processing unit 46 is applied to the brightness/color difference conversion processing unit 47. The brightness/color difference conversion processing unit 47 is a processing unit which converts R'G'B' data to brightness data Y' indicating a brightness component and color difference data Cr' and Cb', and brightness data Y' and color difference data Cr' and Cb' can be calculated by the following expressions.

$$Y'=0.299R'+0.587G'+0.114B'$$

$$Cb'=-0.168736R'-0.331264G'+0.5B'$$

$$Cr'=-0.5R'-0.418688G'-0.081312B' \quad \text{[Equation 2]}$$

R'G'B' data is 8-bit data after the gradation correction and the frequency recovery processing, and the brightness data Y' and color difference data Cr' and Cb' converted from R'G'B' data are also 8-bit data. A conversion expression from R'G'B' data to brightness data Y' and color difference data Cr' and Cb' is not limited to the expression of [Equation 2] described above.

8-bit brightness data Y' and color difference data Cr' and Cb' converted in this way is subjected to compression processing, such as joint photographic coding experts group (JPEG), and then, header information and a plurality of related data, such as compressed main image data and thumbnail image data, are made to correspond to each other and constituted as a single image file.

The storage unit 44*d* (FIG. 8) which stores the phase recovery filters and the storage unit 46*d* (FIG. 11) which stores the frequency recovery filters may be provided separately, or may be the same physically and may have only different storage areas.

In this example, although the phase recovery filters and the frequency recovery filters are respectively stored in the storage units 44*d* and 46*d*, and the phase recovery filter and the frequency recovery filter for use in the recovery processing are appropriately read, the invention is not limited thereto, and the transfer functions (PSF, OTF, PTF, MTF, and the like) of the optical systems may be stored in the storage unit, the transfer function for use in the recovery processing may be read from the storage unit at the time of the recovery processing, and the phase recovery filter and the frequency recovery filter may be sequentially calculated.

Second Embodiment

Figure 12:
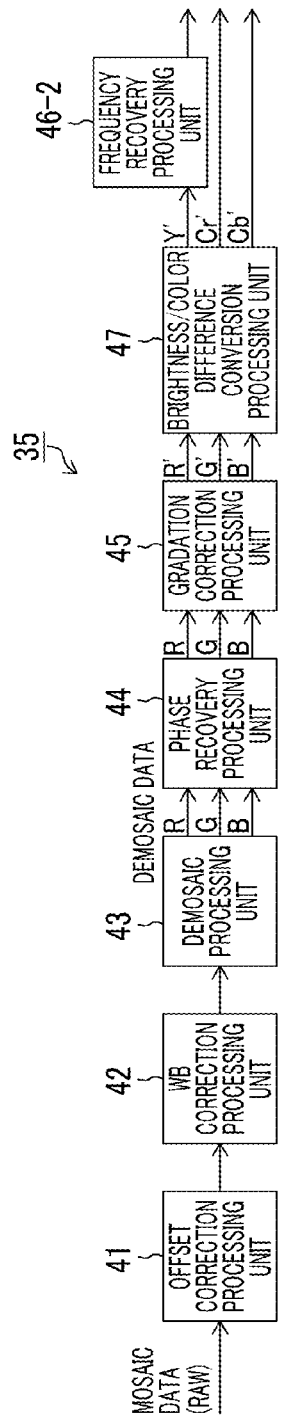
FIG. 12 is a block diagram showing a second embodiment of an image processing unit as an image processing device according to the invention.

FIG. 12 is a block diagram showing a second embodiment of an image processing unit 35 (camera body controller 28) as an image processing device according to the invention. In FIG. 12, the portions common for the first embodiment of the image processing unit 35 shown in FIG. 8 are represented by the same reference numerals, and detailed description thereof will not be repeated.

In the second embodiment, primarily, a frequency recovery processing unit 46-2 is different from the frequency recovery processing unit 46 of the first embodiment.

That is, there is a difference in that, while the frequency recovery processing unit 46 of the first embodiment is provided in the post-stage of the gradation correction processing unit 45 and subjects R'G'B' data after the gradation correction to the frequency recovery processing, the frequency recovery processing unit 46-2 of the second embodiment is provided in the post-stage of the brightness/color difference conversion processing unit 47 and subjects brightness data Y' (after the gradation correction) converted by the brightness/color difference conversion processing unit 47 to the frequency recovery processing.

Figure 13:
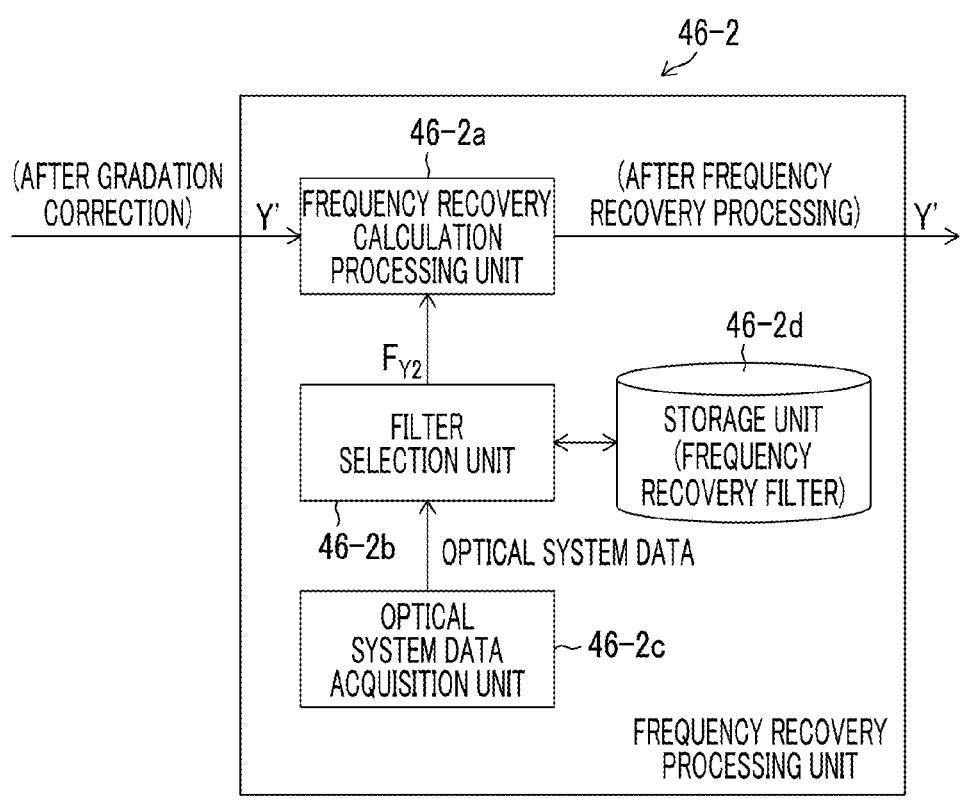
FIG. 13 is a block diagram showing another embodiment of a frequency recovery processing unit in the image processing unit.

FIG. 13 is a block diagram showing another embodiment of a frequency recovery processing unit.

The frequency recovery processing unit 46-2 shown in FIG. 13 has a frequency recovery calculation processing unit 46-2*a*, a filter selection unit 46-2*b*, an optical system data acquisition unit 46-2*c*, and a storage unit 46-2*d*.

The filter selection unit 46-2*b* and the optical system data acquisition unit 46-2*c* respectively correspond to the filter selection unit 44*b* and the optical system data acquisition unit 44*c* shown in FIG. 9, and thus, detailed description thereof will not be repeated.

The storage unit 46-2*d* stores a frequency recovery filter $F_{Y2}$ corresponding to brightness data generated based on the PSF, OTF, and the PTF of a plurality of kinds of optical systems.

The frequency recovery filter $F_{Y2}$ corresponding to brightness data can be calculated based on, for example, MTF by mixing the frequency transfer functions ($MTF_R$, $MTF_G$, $MTF_B$) of the respective color channels of RGB and calculating the modulation transfer function ($MTF_Y$) corresponding to brightness data. When calculating $MTF_Y$, it is preferable to calculate $MTF_R$, $MTF_G$, and $MTF_B$ as a weighted linear sum. The same factor as a factor when generating brightness data Y' from R'G'B' data shown in the expression of [Equation 2] can be used as a weighting factor, but the invention is not limited thereto.

As another example of the frequency recovery filter $F_{Y2}$ corresponding to brightness data, as shown in [Equation 2], a frequency recovery filter $F_{G2}$ corresponding to G' data most contributing to generation of brightness data Y' may be used as the frequency recovery filter $F_{Y2}$ as it is. It is preferable that the storage unit 46-2*d* stores frequency recovery filters $F_{Y2}$ corresponding to F number, a focal distance, an image height, and the like.

The filter selection unit 46-2*b* selects a frequency recovery filter corresponding to optical system data of the optical system used in capturing and acquiring source image data among the frequency recovery filters stored in the storage unit 46-2*d* based on optical system data acquired by the optical system data acquisition unit 46-2*c*. The frequency recovery filter $F_{Y2}$ corresponding to brightness data selected by the filter selection unit 46-2*b* is sent to the frequency recovery calculation processing unit 46-2*a*.

Brightness data Y' after the gradation correction (gamma correction) is input to the frequency recovery calculation processing unit 46-2*a*, and the frequency recovery calculation processing unit 46-2*a* subjects brightness data Y' to the frequency recovery processing using the frequency recovery filter $F_{Y2}$ selected by the filter selection unit 46-2*b*. That is, the frequency recovery calculation processing unit 46-2*a* performs deconvolution calculation of the frequency recovery filter $F_{Y2}$ and brightness data Y' (brightness data Y' of a pixel to be processed and adjacent pixels) corresponding to the frequency recovery filter $F_{Y2}$ and calculates brightness data Y' after the frequency recovery processing.

The frequency recovery processing unit 46-2 configured as above can subject brightness data Y' to the frequency recovery processing reflecting the modulation transfer function (MTF) of brightness data Y'.

Although processing systems for three channels (3ch) are required in the frequency recovery processing for RGB data by the frequency recovery processing unit 46 of the first embodiment, since a processing system for one channel (1ch) is sufficient in the frequency recovery processing for brightness data Y', in the frequency recovery processing for brightness data, it is possible to reduce a circuit scale and computational costs, and to reduce the number of frequency recovery filters stored in the storage unit 46-2d.

In the frequency recovery processing for RGB data, if color data of each color of RGB is acquired as assumed (as point spread function information of the optical system), effective frequency recovery processing of RGB data is possible; however, in a case where the actual behavior of an input signal is not as assumed, in the frequency recovery processing for RGB data, side effects, such as an increase in the number of places where unnecessary coloring occurs and a conspicuous unnatural tone of color, may occur.

In contrast, since the frequency recovery processing unit 46-2 of the second embodiment performs the frequency recovery processing only for brightness data, the side effects described above hardly occur (color system toughness in the degree of coloring, the degree of blurring, or the like).

Since the frequency restoration processing by the frequency recovery processing unit 46-2 is performed for brightness data Y' after gradation correction (gamma correction), similarly to the frequency recovery processing unit 46 of the first embodiment, it is possible to prevent occurred artifact from being enhanced by the gradation correction.

Third Embodiment

Figure 14:
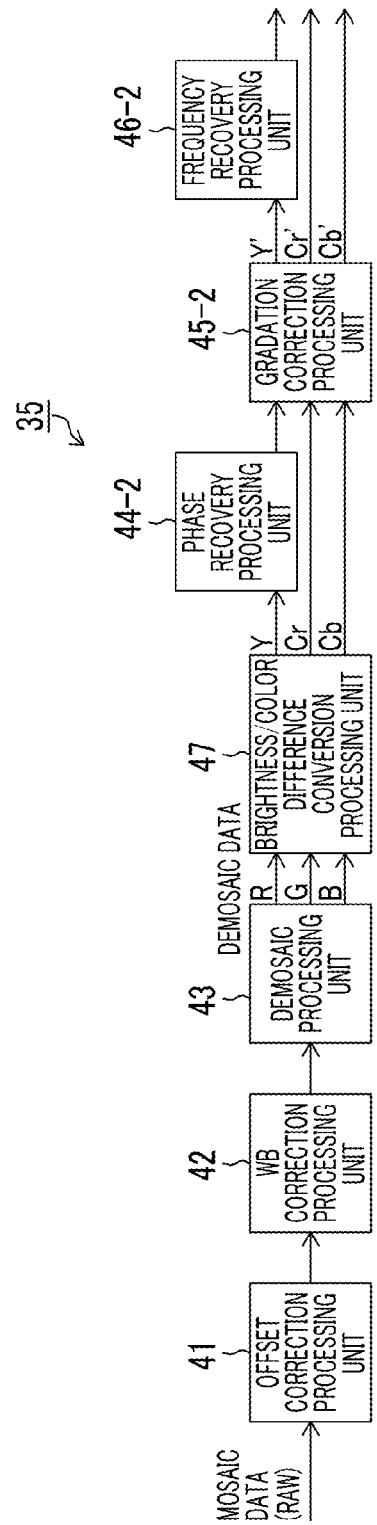
FIG. 14 is a block diagram showing a third embodiment of an image processing unit as an image processing device according to the invention.

FIG. 14 is a block diagram showing a third embodiment of an image processing unit 35 (camera body controller 28) as an image processing device according to the invention. In FIG. 14, the portions common for the first and second embodiments of the image processing unit 35 shown in FIGS. 8 and 12 are represented by the same reference numerals, and detailed description thereof will not be repeated.

In the third embodiment, primarily, the phase recovery processing unit 44-2 is different from the phase recovery processing unit 44 of the first and second embodiments.

That is, there is a difference in that, while the phase recovery processing unit 44 of the first and second embodiments is provided in the post-stage of the demosaic processing unit 43 and subjects demosaic data of R, G, and B to the phase recovery processing, the phase recovery processing unit 44-2 of the third embodiment is provided in the post-stage of the brightness/color difference conversion processing unit 47 and subjects brightness data Y (before the gradation correction) converted by the brightness/color difference conversion processing unit 47 to the phase recovery processing.

Figure 15:
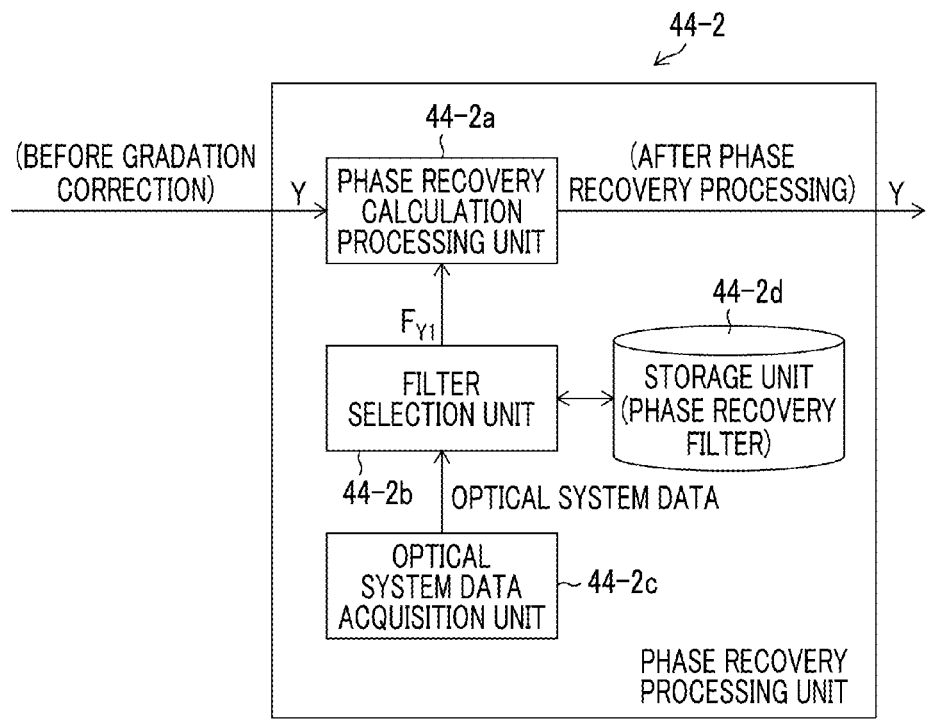
FIG. 15 is a block diagram showing another embodiment of a phase recovery processing unit in the image processing unit.

FIG. 15 is a block diagram showing another embodiment of phase recovery processing unit.

The phase recovery processing unit 44-2 shown in FIG. 15 has a phase recovery calculation processing unit 44-2a, a filter selection unit 44-2b, an optical system data acquisition unit 44-2c, and a storage unit 44-2d.

The filter selection unit 44-2b and the optical system data acquisition unit 44-2c respectively correspond to the filter selection unit 44b and the optical system data acquisition unit 44c shown in FIG. 9, and thus, detailed description thereof will not be repeated.

The storage unit 44-2d stores a phase recovery filter $F_{Y1}$ corresponding to image data (hereinafter, referred to as "brightness data Y") indicating a brightness component generated based on the PSF, the OTF, and the PTF of a plurality of kinds of optical systems.

The phase recovery filter $F_{Y1}$ corresponding to brightness data Y can be generated based on PTF calculated by mixing the phase transfer functions ($PTF_R$, $PTF_G$, $PTF_B$) of the respective color channels of RGB and calculating the phase transfer function ($PTF_Y$) corresponding to brightness data Y. When calculating $PTF_Y$, it is preferable to calculate $PTF_R$, $PTF_G$, and $PTF_B$ as a weighted linear sum. The same factor as a factor when generating brightness data Y' from R'G'B' data shown in the expression of [Equation 2] can be used as a weighting factor, but the invention is not limited thereto.

As another example of the phase recovery filter $F_{Y1}$ corresponding to brightness data Y, as shown in the expression of [Equation 2], a phase recovery filter $F_{G1}$ corresponding to color data of G most contributing to generation of brightness data may be used as the phase recovery filter $F_{Y1}$ as it is. It is preferable that the storage unit 44-2d stores the phase recovery filters $F_{Y1}$ corresponding to F number, a focal distance, an image height, and the like.

The filter selection unit 44-2b selects a phase recovery filter corresponding to optical system data of the optical system used in capturing and acquiring source image data among the phase recovery filters stored in the storage unit 44-2d based on optical system data acquired by the optical system data acquisition unit 44-2c. The phase recovery filter $F_{Y1}$ corresponding to brightness data Y selected by the filter selection unit 44-2b is sent to the phase recovery calculation processing unit 44-2a.

Brightness data Y before the gradation correction (gamma correction) is input from the brightness/color difference conversion processing unit 47 to the phase recovery calculation processing unit 44-2a, and the phase recovery calculation processing unit 44-2a subjects brightness data Y to the phase recovery processing using the phase recovery filter $F_{Y1}$ selected by the filter selection unit 44-2b. That is, the phase recovery calculation processing unit 44-2a performs deconvolution calculation of the phase recovery filter $F_{Y1}$ and brightness data Y (brightness data Y of a pixel to be processed and adjacent pixels) corresponding to the phase recovery filter $F_{Y1}$ and calculates brightness data Y subjected to the phase recovery processing.

The phase recovery processing unit 44-2 configured as above can subject brightness data Y to the phase recovery processing reflecting the phase transfer function (PTF) of brightness data Y.

Although processing systems for three channels (3ch) are required in the phase recovery processing for RGB data by the phase recovery processing unit 44 of the first and second embodiments, since a processing system for one channel (1ch) is sufficient in the phase recovery processing for brightness data Y, in the phase recovery processing for brightness data, it is possible to reduce a circuit scale and computational costs, and to reduce the number of phase recovery filters stored in the storage unit 44-2d.

In regard to the phase recovery processing for RGB data, if RGB data is acquired as assumed (as point spread function information of the optical system), effective phase recovery processing of RGB data is possible, and it is possible to effectively reduce chromatic aberration or the like compared to the phase recovery processing for brightness data; however, in a case where the actual behavior of an input signal is not as assumed, in the phase recovery processing for RGB data, side effects, such as an increase in the number of places where unnecessary coloring occurs and a conspicuous unnatural tone of color, may occur.

In contrast, since the phase recovery processing unit 44-2 of the third embodiment performs the phase recovery processing only for brightness data, the side effects described above hardly occur (color system toughness in the degree of coloring, the degree of blurring, or the like).

Similarly to the second embodiment, since the frequency recovery processing by the frequency recovery processing unit 46-2 is performed for brightness data Y' after the gradation correction (gamma correction), the same effects as in the second embodiment are obtained.

Since the image processing unit 35 (point image restoration control processing unit 36) of the third embodiment subjects brightness data Y before the gradation correction to the phase recovery processing and subjects brightness data Y' after the gradation correction to the frequency recovery processing, it is possible to minimize a circuit scale and computational costs among the first to third embodiments.

In the third embodiment shown in FIG. 14, the brightness/color difference conversion processing unit 47 converts respective pieces of color data (RGB) before the gradation correction to brightness data Y and color difference data Cr and Cb, and is different from the first and second embodiments in which R'G'B' data after the gradation correction is converted to brightness data Y' and color difference data Cr' and Cb'; however, the processing content is the same.

The gradation correction processing unit 45-2 of the third embodiment is different from the gradation correction processing unit 45 of the first and second embodiments in that, while the gradation correction processing unit 45 of the first and second embodiments subjects RGB data to the gradation correction (gamma correction), the gradation correction processing unit 45-2 of the third embodiment subjects brightness data Y subjected to the phase recovery processing by the phase recovery processing unit 44-2 and color difference data Cr and Cb converted by the brightness/color difference conversion processing unit 47 to nonlinear gradation correction (gamma correction). While brightness data Y and color difference data Cr and Cb input to the gradation correction processing unit 45-2 are respectively 12-bit data (2-byte data), brightness data Y' and color difference data Cr' and Cb' after the gradation correction are respectively converted to 8-bit data (1-byte data).

Modification Examples

The digital camera 10 described above is just for illustration, and the invention can be applied to other configurations. Each functional configuration can be appropriately realized by arbitrary hardware, software, or a combination thereof. For example, the invention can be applied to an image processing program which causes a computer to execute an image processing method (step, processing procedure) in each device and each processing unit (the camera body controller 28, the image processing unit 35, the gradation correction processing unit 33, the point image restoration control processing unit 36, and the like), a computer-readable recording medium (non-transitory recording medium) having the image processing program recorded thereon, or various computers on which the image processing program is installable.

<Application Example to EDoF System>

Although the point image restoration processing (the phase recovery processing and the frequency recovery processing) in the embodiments described above is image processing for performing the frequency recovery processing and the phase recovery processing of point spread (point image blur) according to specific imaging condition information (for example, F number, a focal distance, a lens type, and the like) to restore an original object image, image processing to which the invention can be applied is not limited to the restoration processing in the embodiments described above. For example, the restoration processing according to the invention can also be applied to restoration processing on image data captured and acquired by an optical system (an imaging lens or the like) having an extended depth of field (focus) (EDoF). Image data of a blurred image captured and acquired in a state where the depth of field (depth of focus) is extended by the EDoF optical system is subjected to the restoration processing, whereby image data of high resolution in a focused state over a wide range can be restored and generated. In this case, the restoration processing is performed using a phase recovery filter and a frequency recovery filter which are based on a transfer function (PSF, OTF, MTF, PTF, or the like) of the EDoF optical system and have filter coefficients set such that satisfactory image restoration can be performed within a range of an extended depth of field (depth of focus).

Figure 16:
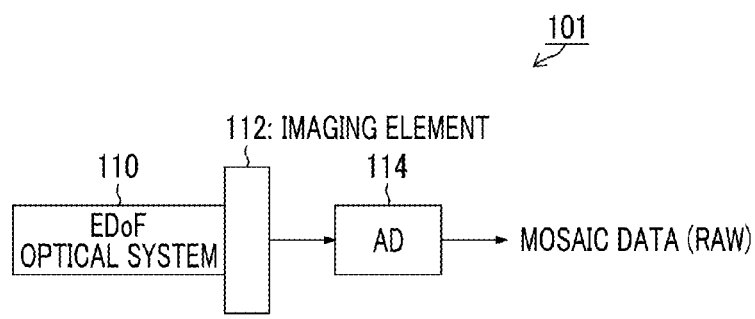
FIG. 16 is a block diagram showing a form of an imaging module comprising an EDoF optical system.

FIG. 16 is a block diagram showing a form of an imaging module 101 including an EDoF optical system. The imaging module (a camera head mounted in a digital camera or the like) 101 of this example includes an EDoF optical system (lens unit) 110, an imaging element 112, and an AD conversion unit 114.

Figure 17:
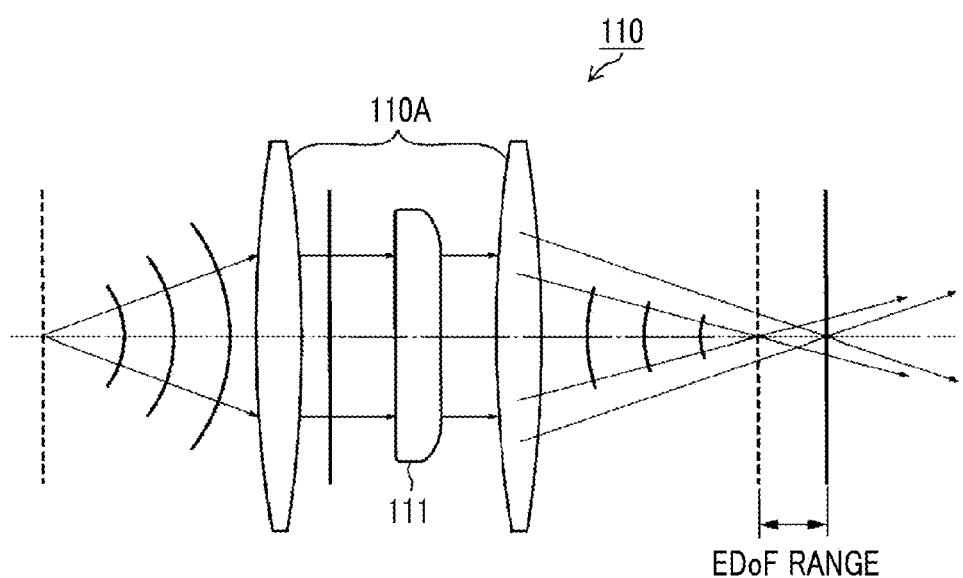
FIG. 17 is a diagram showing an example of the EDoF optical system.

FIG. 17 is a diagram showing an example of an EDoF optical system 110. The EDoF optical system 110 of this example has a single-focus fixed imaging lens 110A, and an optical filter 111 which is arranged at a pupil position. The optical filter 111 modulates a phase, and makes the imaging lens 110A constituting the EDoF optical system 110 have an extended depth of field such that an extended depth of field (depth of focus) (EDoF) is obtained. In this way, the imaging lens 110A and the optical filter 111 constitute a lens unit which modulates a phase to extend a depth of field.

The EDoF optical system 110 includes other components as necessary, and for example, a diaphragm (not shown) is provided near the optical filter 111. The optical filter 111 may be one sheet or may be constituted by combining a plurality of sheets. The optical filter 111 is only an example of optical phase modulation means, and the EDoF of the EDoF optical system 110 (the imaging lens 110A) may be implemented by other means. For example, instead of providing the optical filter 111, the EDoF of the EDoF optical system 110 may be implemented by the imaging lens 110A designed to have the same function as the optical filter 111 of this example.

That is, the EDoF of the EDoF optical system 110 can be implemented by various means for changing the wavefront of imaging on the light receiving surface of the imaging element 112. For example, "an optical element with a variable thickness", "an optical element with a variable refractive index (a refractive index distribution type wavefront modulation lens or the like)", "an optical element with a variable thickness or refractive index coating on the lens surface or the like (a wavefront modulation hybrid lens, an optical element formed on the lens surface as a phase plane, or the like)", or "a liquid crystal element capable of modulating a phase distribution of light (a liquid crystal spatial phase modulation element or the like)" may be used as EDoF means of the EDoF optical system 110. In this way, the invention can be applied to not only a case where image formation can be performed to be regularly dispersed by an optical wavefront modulation element (the optical filter 111 (phase plate)), but also a case where the same dispersed images as the case of using the optical wavefront modulation element can be formed by the imaging lens 110A itself without using the optical wavefront modulation element.

The EDoF optical system 110 shown in FIGS. 16 and 17 can be reduced in size since a focus adjustment mechanism which performs focus adjustment mechanically can be omitted, and can be suitably mounted in a camera-equipped mobile phone or a mobile information terminal portable.

An optical image after passing through the EDoF optical system 110 having the EDoF is formed on the imaging element 112 shown in FIG. 16 and is converted to an electrical signal here.

The imaging element 112 is constituted of a plurality of pixels arranged in a matrix by a predetermined pattern array (Bayer array, G stripe RIG full checkered pattern, X-Trans (Registered Trademark) array, honeycomb array, or the like), and each pixel includes a microlens, a color filter (in this example, an RGB color filter), and a photodiode. An optical image incident on the light receiving surface of the imaging element 112 through the EDoF optical system 110 is converted to a signal charge in the amount according to the amount of incident light by each photodiode arranged on the light receiving surface. The signal charge of R, G, and B accumulated in each photodiode is sequentially output as a voltage signal (image signal) for each pixel.

The analog-to-digital conversion unit (AD conversion unit) 114 converts the analog R, G, and B image signals output from the imaging element 112 for each pixel to digital RGB image signals. The digital image signals converted to the digital image signals by the AD conversion unit 114 are output as mosaic data (RAW image data).

The image processing unit (image processing device) 35 shown in the first to third embodiments described above is applied to mosaic data output from the imaging module 101, whereby it is possible to generate recovered image data in a focused state over a wide range.

Figure 18:
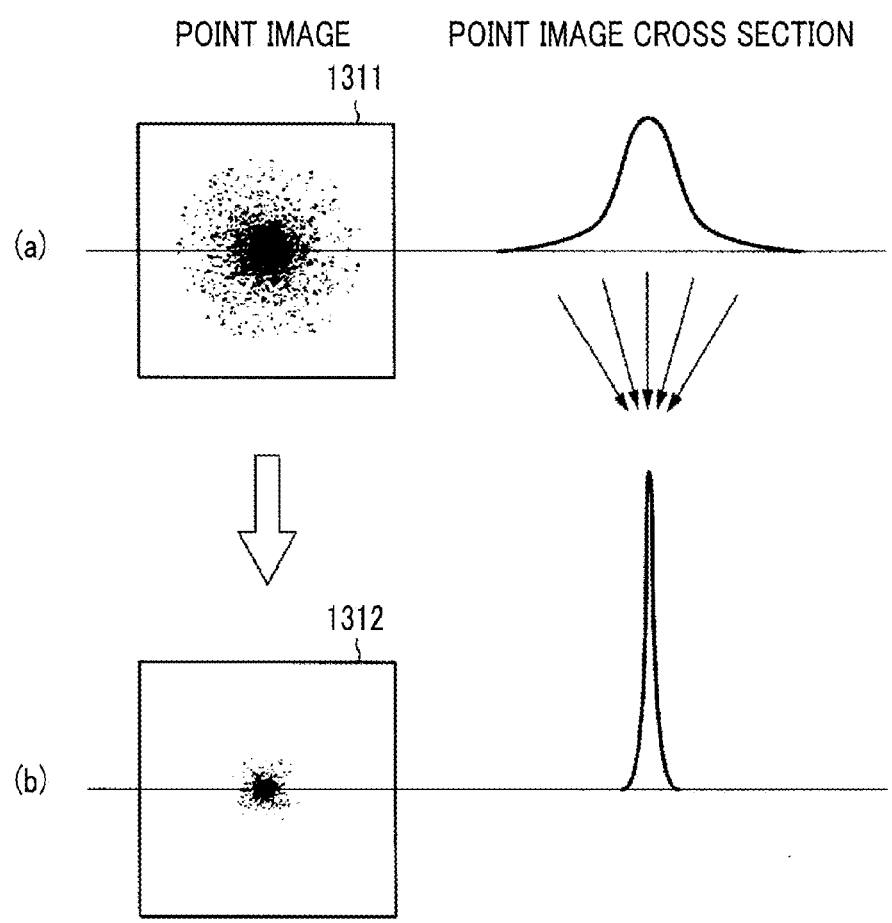
FIG. 18 is a diagram showing a restoration example of an image acquired through the EDoF optical system.

That is, as indicated by reference numeral 1311, in (a) of FIG. 18, a point image (optical image) after passing through the EDoF optical system 110 is formed on the imaging element 112 as a large point image (blurred image), but is recovered to a small point image (high-resolution image) through the point image restoration processing (the phase recovery processing and the frequency recovery processing) by the image processing unit (image processing device) 35 as indicated by reference numeral 1312, in (b) of FIG. 18.

In the respective embodiments described above, although a form in which the image processing unit (image processing device) 35 is provided in the camera body 14 (camera body controller 28) of the digital camera 10 has been described, the image processing unit (image processing device) 35 may be provided in other devices, such as the computer 60 or the server 80.

For example, when processing image data in the computer 60, the point image restoration processing of image data may be performed by the image processing unit (image processing device) 35 provided in the computer 60. In a case where the server 80 comprises the image processing unit (image processing device) 35, for example, image data may be transmitted from the digital camera 10 or the computer 60 to the server 80, image data may be subjected to the point image restoration processing in the image processing unit (image processing device) 35 of the server 80, and image data (recovered image data) after the point image restoration processing may be transmitted and provided to a transmission source.

An aspect to which the invention can be applied is not limited to the digital camera 10, the computer 60, and the server 80, and the invention can be applied to mobile devices having an imaging function and functions (call handling function, communication function, and other computer functions) other than imaging, in addition to cameras having imaging as a major function. As another aspect to which the invention can be applied, for example, mobile phones having a camera function, smartphones, personal digital assistants (PDAs), and portable game machines are given. Hereinafter, an example of a smartphone to which the invention can be applied will be described.

<Configuration of Smartphone>

Figure 19:
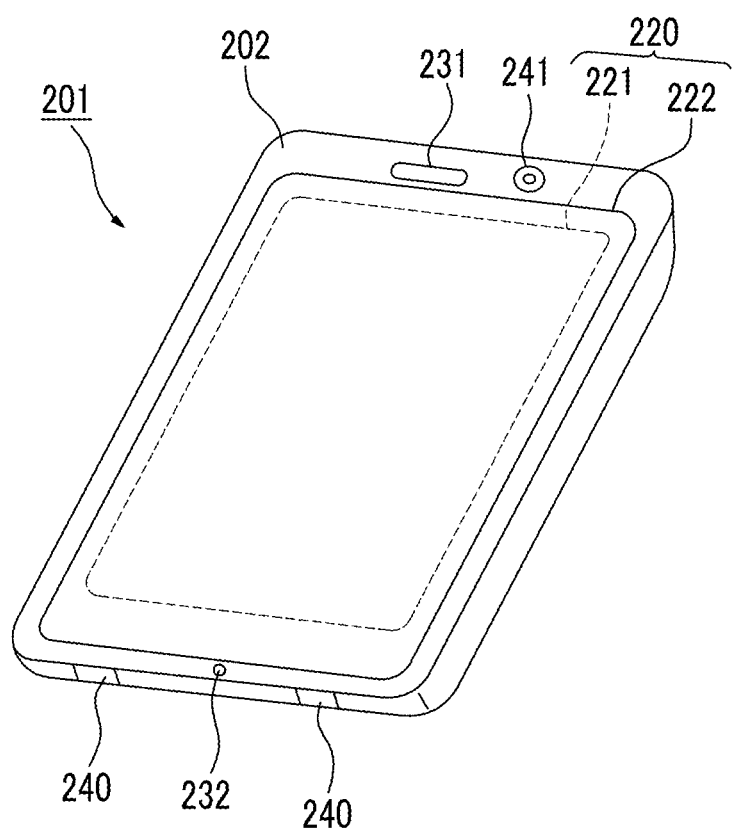
FIG. 19 shows the appearance of a smartphone which is an embodiment of an imaging device of the invention.

FIG. 19 shows the appearance of a smartphone 201 which is an embodiment of an imaging device of the invention. The smartphone 201 shown in FIG. 19 has a flat plate-like housing 202, and includes, on one surface of the housing 202, a display input unit 220 in which a display panel 221 as a display unit and an operation panel 222 as an input unit are integrated. The housing 202 includes a speaker 231, a microphone 232, an operating unit 240, and a camera unit 241. The configuration of the housing 202 is not limited thereto, and for example, a configuration in which a display unit and an input unit are separated can be used, or a configuration in which a folding structure or a slide mechanism is provided.

Figure 20:
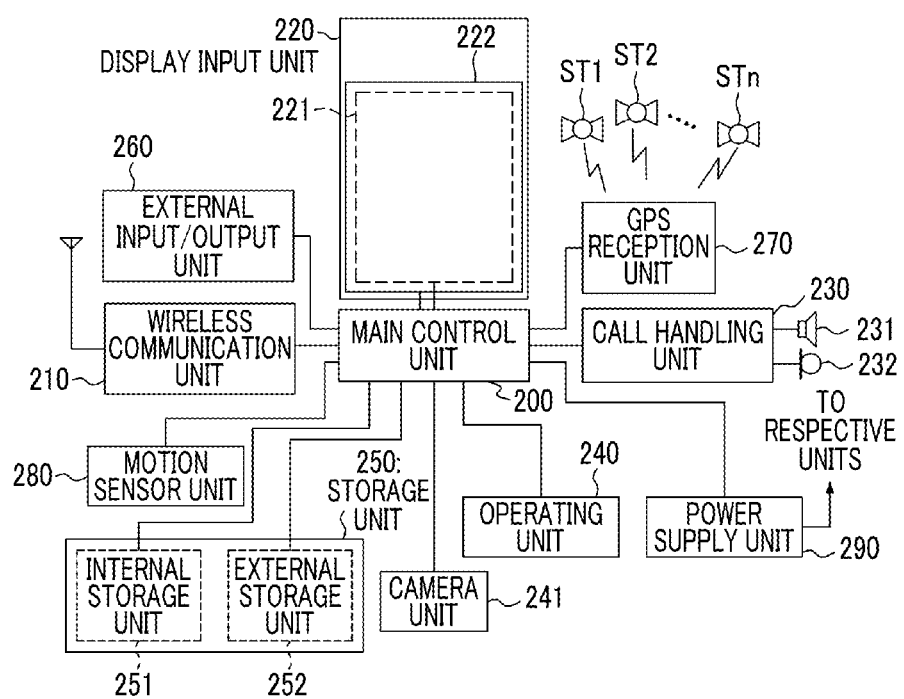
FIG. 20 is a block diagram showing the configuration of the smartphone shown in FIG. 19.

FIG. 20 is a block diagram showing the configuration of the smartphone 201 shown in FIG. 19. As shown in FIG. 20, the smartphone includes, as major components, a wireless communication unit 210, a display input unit 220, a call handling unit 230, an operating unit 240, a camera unit 241, a storage unit 250, an external input/output unit 260, a global positioning system (GPS) reception unit 270, a motion sensor unit 280, a power supply unit 290, and a main control unit 200. The smartphone 201 has, as a major function, a wireless communication function of performing mobile wireless communication through a base station device BS and a mobile communication network NW.

The wireless communication unit 210 performs wireless communication with the base station device BS in the mobile communication network NW according to an instruction of the main control unit 200. Transmission/reception of various kinds of file data, such as speech data or image data, electronic mail data, and the like, or reception of Web data, streaming data, or the like is performed using wireless communication.

The display input unit 220 is a so-called touch panel which displays images (still image and motion image), character information, or the like under the control of the main control unit 200 to visually transfer information to the user and detects a user's operation on the displayed information, and includes the display panel 221 and the operation panel 222.

The display panel 221 uses a liquid crystal display (LCD) or an organic electro-luminescence display (OELD) as a display device. The operation panel 222 is a device which is placed such that an image displayed on the display surface of the display panel 221 is visible, and detects one or a plurality of coordinates operated with the finger of the user or a stylus. If the device is operated with the finger of the user or the stylus, a detection signal generated due to the operation is output to the main control unit 200. Next, the main control unit 200 detects the operation position (coordinates) on the display panel 221 based on the received detection signal.

As shown in FIG. 19, the display panel 221 and the operation panel 222 of the smartphone 201 illustrated as an embodiment of an imaging device of the invention are integrated to constitute the display input unit 220, and the operation panel 222 is arranged so as to completely cover the display panel 221. In a case where this arrangement is used, the operation panel 222 may have a function of detecting a user's operation in an area outside the display panel 221. In other words, the operation panel 222 may include a detection area (hereinafter, referred to as a display area) for a superimposed portion overlapping the display panel 221 and a detection area (hereinafter, referred to as a non-display area) for an outer edge portion not overlapping the display panel 221.

Although the size of the display area may completely match the size of the display panel 221, both do not necessarily match each other. The operation panel 222 may include two sensitive areas of an outer edge portion and an inside portion. In addition, the width of the outer edge portion is appropriately designed according to the size of the housing 202 or the like. Furthermore, as a position detection system which is used in the operation panel 222, a matrix switch system, a resistive film system, a surface acoustic wave system, an infrared system, an electromagnetic induction system, an electrostatic capacitance system, or the like is given, and any system can be used.

The call handling unit 230 includes a speaker 231 and a microphone 232, converts speech of the user input through the microphone 232 to speech data processable in the main control unit 200 and outputs speech data to the main control unit 200, or decodes speech data received by the wireless communication unit 210 or the external input/output unit 260 and outputs speech from the speaker 231. As shown in FIG. 19, for example, the speaker 231 and the microphone 232 can be mounted on the same surface as the surface on which the display input unit 220 is provided.

The operating unit 240 is a hardware key, such as a key switch, and receives an instruction from the user. For example, as shown in FIG. 19, the operating unit 240 is a push button-type switch which is mounted on the side surface of the housing 202 of the smartphone 201, and is turned on when pressed with a finger or the like and is turned off by a restoration force of the panel or the like if the finger is released.

The storage unit 250 stores a control program or control data of the main control unit 200, application software, address data in association with the name, telephone number, and the like of a communication partner, data of transmitted and received electronic mail, Web data downloaded by Web browsing, downloaded content data, or temporarily stores streaming data or the like. The storage unit 250 is constituted of an internal storage unit 251 embedded in the smartphone and an external storage unit 252 which has a detachable external memory slot. The internal storage unit 251 and the external storage unit 252 constituting the storage unit 250 are implemented using a memory (for example, MicroSD (Registered Trademark) memory or the like) of a flash memory type, a hard disk type, a multimedia card micro type, or a card type, or a storage medium, such as a random access memory (RAM) or a read only memory (ROM).

The external input/output unit 260 plays a role of an interface with all external devices connected to the smartphone 201, and is provided for direct or indirect connection to other external devices by communication or the like (for example, universal serial bus (USB), IEEE1394 or the like), or a network (for example, Internet, wireless LAN, Bluetooth (Registered Trademark), radio frequency identification (RFID), infrared data association (IrDA) (Registered Trademark), ultra wideband (UWB) (Registered Trademark), ZigBee (Registered Trademark), or the like).

The external device connected to the smartphone 201 is, for example, a wired or wireless headset, a wired or wireless external charger, a wired or wireless data port, a memory card connected through a card socket, a subscriber identity module (SIM)/user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone, or the like. The external input/output unit can transfer data transmitted from the external devices to the respective components in the smartphone 201, or can transmit data in the smartphone 201 to the external devices.

The GPS reception unit 270 receives GPS signals transmitted from GPS satellites ST1 to STn according to an instruction of the main control unit 200, executes positioning calculation processing based on a plurality of received GPS signals, and detects the position of the smartphone 201 having latitude, longitude, and altitude. When positional information can be acquired from the wireless communication unit 210 or the external input/output unit 260 (for example, a wireless LAN), the GPS reception unit 270 may detect the position using the positional information.

The motion sensor unit 280 includes, for example, a three-axis acceleration sensor or the like, and detects physical motion of the smartphone 201 according to an instruction of the main control unit 200. The moving direction or acceleration of the smartphone 201 can be detected by detecting physical motion of the smartphone 201. The detection result is output to the main control unit 200.

The power supply unit 290 supplies power stored in a battery (not shown) to the respective units of the smartphone 201 according to an instruction of the main control unit 200.

The main control unit 200 includes a microprocessor, operates according to the control program or control data stored in the storage unit 250, and integrally controls the respective units of the smartphone 201. The main control unit 200 has a mobile communication control function of controlling the respective units of a communication system in order to perform speech communication or data communication through the wireless communication unit 210, and an application processing function.

The application processing function is implemented by the main control unit 200 operating according to application software stored in the storage unit 250. The application processing function is, for example, an infrared communication function of controlling the external input/output unit 260 to perform data communication with a counter device, an electronic mail function of transmitting and receiving electronic mail, a Web browsing function of browsing Web pages, or the like.

The main control unit 200 has an image processing function of displaying video on the display input unit 220, or the like based on image data (still image or motion image data), such as received data or downloaded streaming data. The image processing function refers to a function of the main control unit 200 decoding image data, subjecting the decoding result to image processing, and displaying an image on the display input unit 220.

The main control unit 200 executes display control on the display panel 221, and operation detection control for detecting a user's operation through the operating unit 240 and the operation panel 222.

With the execution of the display control, the main control unit 200 displays an icon for activating application software or a software key, such as a scroll bar, or displays a window for creating electronic mail. The scroll bar refers to a software key for receiving an instruction to move a display portion of an image which is too large to fit into the display area of the display panel 221.

With the execution of the operation detection control, the main control unit 200 detects a user's operation through the operating unit 240, receives an operation on the icon or an input of a character string in an entry column of the window through the operation panel 222, or receives a scroll request of a display image through the scroll bar.

Furthermore, with the execution of the operation detection control, the main control unit 200 has a touch panel control function of determining whether an operation position on the operation panel 222 is the superimposed portion (display area) overlapping the display panel 221 or the outer edge portion (non-display area) not overlapping the display panel 221, and controlling the sensitive area of the operation panel 222 or the display position of the software key.

The main control unit 200 may detect a gesture operation on the operation panel 222 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the operations.

The camera unit 241 is a digital camera which electronically captures an image using an imaging element, such as a complementary metal oxide semiconductor (CMOS) or a charge-coupled device (CCD). The camera unit 241 can convert image data obtained by imaging to compressed image data, such as joint photographic coding experts group (JPEG), and can record image data in the storage unit 250 under the control of the main control unit 200. Furthermore, the camera unit 241 can output image data through the external input/output unit 260 or the wireless communication unit 210. As shown in FIG. 19, in the smartphone 201, the camera unit 241 is mounted on the same surface of the display input unit 220; however, the mounting position of the camera unit 241 is not limited thereto, and the camera unit 241 may be mounted on the rear surface of the display input unit 220, or a plurality of camera units 241 may be mounted. In a case where a plurality of camera units 241 are mounted, the camera unit 241 which is used to capture an image is switched from one to another and captures an image alone, or a plurality of camera units 241 are simultaneously used to capture images.

The camera unit 241 is used for various functions of the smartphone 201. For example, an image acquired by the camera unit 241 can be displayed on the display panel 221, or an image in the camera unit 241 can be used as one operation input on the operation panel 222. When the GPS reception unit 270 detects the position, the position may be detected with reference to an image from the camera unit 241. In addition, the optical axis direction of the camera unit 241 of the smartphone 201 may be determined or the current use environment can be determined with reference to an image from the camera unit 241 without using the three-axis acceleration sensor, or using the three-axis acceleration sensor. Of course, an image from the camera unit 241 may be used in application software.

In addition, image data of a still image or a motion image can be attached with positional information acquired by the GPS reception unit 270, speech information acquired by the microphone 232, speech information (may be text information through speech-text conversion in the main control unit or the like), posture information acquired by the motion sensor unit 280, or the like and can be recorded in the storage unit 250, or may be output through the external input/output unit 260 or the wireless communication unit 210.

In the smartphone 201 described above, the respective processing units described above in connection with the point image restoration processing can be appropriately implemented by, for example, the main control unit 200, the storage unit 250, and the like.

The invention is not limited to the embodiments described above, and various modifications can be made without departing from the spirit of the invention.

EXPLANATION OF REFERENCES

10: digital camera
12: lens unit
14: camera body
16: lens
17: diaphragm
18: optical system operating unit
20: lens unit controller
22: lens unit input/output unit
26: imaging element
28: body controller
29: user interface
30: camera body input/output unit
32: input/output interface
33: gradation correction processing unit
34: device control unit
35: image processing unit
36: point image restoration control processing unit
41: offset correction processing unit
42: WB correction processing unit
43: demosaic processing unit
44, 44-2: phase recovery processing unit
44a, 44-2a: phase recovery calculation processing unit
44b, 44-2b, 46b, 46-2b: filter selection unit
44c, 44-2c, 46c, 46-2c: optical system data acquisition unit
44d, 44-2d, 46d, 46-2d, 250: storage unit
45, 45-2: gradation correction processing unit
46, 46-2: frequency recovery processing unit
46a, 46-2a: frequency recovery calculation processing unit
47: brightness/color difference conversion processing unit
101: imaging module
110: EDoF optical system
110A: imaging lens
111: optical filter
112: imaging element
114: AD conversion unit
200: main control unit
201: smartphone
202: housing
210: wireless communication unit
220: display input unit
221: display panel
222: operation panel
230: call handling unit
231: speaker
232: microphone
240: operating unit
241: camera unit
251: internal storage unit
252: external storage unit
260: external input/output unit
270: reception unit
280: motion sensor unit
290: power supply unit

What is claimed is:
1. An image processing device comprising:
a phase recovery processing circuit which subjects image data acquired from an imaging element by capturing an object image using an optical system to phase recovery processing using a phase recovery filter based on a point spread function of the optical system;

a gradation correction processing circuit which subjects image data subjected to the phase recovery processing to nonlinear gradation correction; and a frequency recovery processing circuit which subjects image data subjected to the gradation correction to frequency recovery processing using a frequency recovery filter based on the point spread function of the optical system.

2. The image processing device according to claim 1, further comprising:

a storage which stores the phase recovery filter and the frequency recovery filter, wherein the phase recovery processing circuit reads the phase recovery filter from the storage and uses the phase recovery filter in the phase recovery processing, and the frequency recovery processing circuit reads the frequency recovery filter from the storage and uses the frequency recovery filter in the frequency recovery processing.

3. The image processing device according to claim 1, further comprising:

a storage which stores the point spread function of the optical system, an optical transfer function obtained by Fourier-transforming the point spread function, or a modulation transfer function indicating an amplitude component of the optical transfer function and a phase transfer function indicating a phase component of the optical transfer function, wherein the phase recovery processing circuit reads the point spread function, the optical transfer function, or the phase transfer function from the storage, generates the phase recovery filter, and uses the generated phase recovery filter in the phase recovery processing, and the frequency recovery processing circuit reads the point spread function, the optical transfer function, or the modulation transfer function from the storage, generates the frequency recovery filter, and uses the generated frequency recovery filter in the frequency recovery processing.

4. The image processing device according to claim 1, wherein the phase recovery processing circuit subjects image data acquired from the imaging element, which is image data for each color channel, to phase recovery processing using a phase recovery filter, and the frequency recovery processing circuit subjects the image data subjected to the gradation correction, which is image data for each color channel, to frequency recovery processing using a frequency recovery filter.

5. The image processing device according to claim 2, wherein the phase recovery processing circuit subjects image data acquired from the imaging element, which is image data for each color channel, to phase recovery processing using a phase recovery filter, and the frequency recovery processing circuit subjects the image data subjected to the gradation correction, which is image data for each color channel, to frequency recovery processing using a frequency recovery filter.

6. The image processing device according to claim 3, wherein the phase recovery processing circuit subjects image data acquired from the imaging element, which is image data for each color channel, to phase recovery processing using a phase recovery filter, and the frequency recovery processing circuit subjects the image data subjected to the gradation correction, which is image data for each color channel, to frequency recovery processing using a frequency recovery filter.

7. The image processing device according to claim 1, wherein the phase recovery processing circuit subjects image data acquired from the imaging element, which is image data for each color channel, to phase recovery processing using the phase recovery filter, and the frequency recovery processing circuit subjects image data subjected to gradation correction by the gradation correction processing circuit, which is image data indicating a brightness component generated from image data for each color channel, to frequency recovery processing using the frequency recovery filter.

8. The image processing device according to claim 2, wherein the phase recovery processing circuit subjects image data acquired from the imaging element, which is image data for each color channel, to phase recovery processing using the phase recovery filter, and the frequency recovery processing circuit subjects image data subjected to gradation correction by the gradation correction processing circuit, which is image data indicating a brightness component generated from image data for each color channel, to frequency recovery processing using the frequency recovery filter.

9. The image processing device according to claim 3, wherein the phase recovery processing circuit subjects image data acquired from the imaging element, which is image data for each color channel, to phase recovery processing using the phase recovery filter, and the frequency recovery processing circuit subjects image data subjected to gradation correction by the gradation correction processing circuit, which is image data indicating a brightness component generated from image data for each color channel, to frequency recovery processing using the frequency recovery filter.

10. The image processing device according to claim 1, wherein the phase recovery processing circuit subjects image data acquired from the imaging element, which is image data indicating a brightness component generated from image data for each color channel, to phase recovery processing using the phase recovery filter, and the frequency recovery processing circuit subjects the image data subjected to the gradation correction, which is image data indicating a brightness component generated from image data for each color channel, to frequency recovery processing using the frequency recovery filter.

11. The image processing device according to claim 2, wherein the phase recovery processing circuit subjects image data acquired from the imaging element, which is image data indicating a brightness component generated from image data for each color channel, to phase recovery processing using the phase recovery filter, and the frequency recovery processing circuit subjects the image data subjected to the gradation correction, which is image data indicating a brightness component generated from image data for each color channel, to frequency recovery processing using the frequency recovery filter.

12. The image processing device according to claim 3, wherein the phase recovery processing circuit subjects image data acquired from the imaging element, which is image data indicating a brightness component generated from image data for each color channel, to phase recovery processing using the phase recovery filter, and the frequency recovery processing circuit subjects the image data subjected to the gradation correction, which is image data indicating a brightness component generated from image data for each color channel, to frequency recovery processing using the frequency recovery filter.

13. The image processing device according to claim 10, further comprising:
a brightness data generation circuit which generates brightness data indicating a brightness component from image data for each color channel acquired from the imaging element,
wherein the phase recovery processing circuit subjects brightness data generated by the brightness data generation circuit to phase recovery processing using the phase recovery filter,
the gradation correction processing circuit subjects the brightness data subjected to the phase recovery processing to nonlinear gradation correction, and
the frequency recovery processing circuit subjects the brightness data subjected to the gradation correction to frequency recovery processing using the frequency recovery filter.

14. The image processing device according to claim 11, further comprising:
a brightness data generation circuit which generates brightness data indicating a brightness component from image data for each color channel acquired from the imaging element,
wherein the phase recovery processing circuit subjects brightness data generated by the brightness data generation circuit to phase recovery processing using the phase recovery filter,
the gradation correction processing circuit subjects the brightness data subjected to the phase recovery processing to nonlinear gradation correction, and
the frequency recovery processing circuit subjects the brightness data subjected to the gradation correction to frequency recovery processing using the frequency recovery filter.

15. The image processing device according to claim 1, wherein the gradation correction processing circuit is a gamma correction processing circuit which subjects the image data to gradation correction by logarithmic processing.

16. The image processing device according to claim 1, wherein the bit length of the image data subjected to phase recovery processing by the phase recovery processing circuit is greater than the bit length of the image data subjected to frequency recovery processing by the frequency recovery processing circuit.

17. The image processing device according to claim 1, wherein the optical system has a lens unit which enlarges a depth of field by modulating a phase.

18. An imaging device comprising:
an imaging element which outputs image data by capturing an object image using an optical system; and
the image processing device according to claim 1.

19. An image processing method using the image processing device according to claim 1 comprising:
a step of subjecting image data acquired from an imaging element by capturing an object image using an optical system to phase recovery processing using a phase recovery filter based on a point spread function of the optical system;
a step of subjecting image data subjected to the phase recovery processing to nonlinear gradation correction; and
a step of subjecting image data subjected to the gradation correction to frequency recovery processing using a frequency recovery filter based on the point spread function of the optical system.

20. A non-transitory computer readable recording medium storing an image processing program which causes a computer to execute:
a step of subjecting image data acquired from an imaging element by capturing an object image using an optical system to phase recovery processing using a phase recovery filter based on a point spread function of the optical system;
a step of subjecting image data subjected to the phase recovery processing to nonlinear gradation correction; and
a step of subjecting image data subjected to the gradation correction to frequency recovery processing using a frequency recovery filter based on the point spread function of the optical system.

* * * * *